United States Patent
Threlkeld et al.

(10) Patent No.: US 10,635,296 B2
(45) Date of Patent: Apr. 28, 2020

(54) PARTITIONED APPLICATION PRESENTATION ACROSS DEVICES

(71) Applicant: Microsoft Technology Licensing, LLC, Redmond, WA (US)

(72) Inventors: Elizabeth Fay Threlkeld, Redmond, WA (US); William Scott Stauber, Seattle, WA (US); Petteri Mikkola, Bellevue, WA (US); Keri Kruse Moran, Bellevue, WA (US); Issa Y. Khoury, Redmond, WA (US); Brian David Cross, Seattle, WA (US); Darren Ray Davis, Woodinville, WA (US); Giorgio Francesco Sega, Kirkland, WA (US); Kenton Allen Shipley, Woodinville, WA (US); Ramrajprabu Balasubramanian, Renton, WA (US); Patrick Derks, Seattle, WA (US); Mohammed Kaleemur Rahman, Seattle, WA (US); Ryan Chandler Pendlay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 14/495,228

(22) Filed: Sep. 24, 2014

(65) Prior Publication Data
US 2016/0085439 A1    Mar. 24, 2016

(51) Int. Cl.
*G06F 3/14*      (2006.01)
*G06F 3/0488*   (2013.01)
(Continued)

(52) U.S. Cl.
CPC .......... *G06F 3/04883* (2013.01); *G06F 3/033* (2013.01); *G06F 3/0486* (2013.01);
(Continued)

(58) Field of Classification Search
CPC ... G06F 3/1423; G06F 3/1454; H04L 67/025; H04N 21/4126
See application file for complete search history.

(56) References Cited

U.S. PATENT DOCUMENTS

| 5,880,732 A | 3/1999 | Tryding |
| 6,748,195 B1 | 6/2004 | Phillips |

(Continued)

FOREIGN PATENT DOCUMENTS

| CN | 1782997 A | 6/2006 |
| CN | 101052939 A | 10/2007 |

(Continued)

OTHER PUBLICATIONS

Reply Written Opinion cited in PCT Application No. PCT/US2015/050664 dated Jun. 22, 2016, 5 pgs.
(Continued)

*Primary Examiner* — Alvin H Tan
(74) *Attorney, Agent, or Firm* — Newport IP, LLC; Benjamin A. Keim

(57) ABSTRACT

In many computing scenarios, a user of a primary device may wish to incorporate an auxiliary device in the presentation of an application. Such incorporation may involve a terminal services session that projects the computing environment of the primary device onto the auxiliary device; mirroring the computing environment of the primary device through the auxiliary device; and/or utilizing applications that interoperate with client applications executing on the second device. However, such techniques may not fully reflect the properties of each device, and/or may only apply to particular applications and/or configurations. Instead, the primary device may adapt the primary computing environment to an auxiliary computing environment according to a device property of the auxiliary device; partition the application into a primary application portion presented within
(Continued)

the primary computing environment and an auxiliary application portion presented within the auxiliary computing environment; and transmit the auxiliary computing environment to the auxiliary device.

20 Claims, 10 Drawing Sheets

(51) Int. Cl.
    *H04L 29/08*                 (2006.01)
    *G06F 3/033*                 (2013.01)
    *G06F 3/0486*              (2013.01)
    *G06F 9/451*                 (2018.01)

(52) U.S. Cl.
    CPC ............ *G06F 9/451* (2018.02); *H04L 67/025* (2013.01); *H04L 67/10* (2013.01)

(56) References Cited

U.S. PATENT DOCUMENTS

| | | | |
|---|---|---|---|
| 6,856,960 B1 | 2/2005 | Dragosh et al. | |
| 6,941,356 B2 | 9/2005 | Meyerson | |
| 6,952,676 B2 | 10/2005 | Sherman | |
| 6,973,535 B2 | 12/2005 | Bruner et al. | |
| 7,345,671 B2 | 3/2008 | Robbin et al. | |
| 7,392,193 B2 | 6/2008 | Mault | |
| 7,437,183 B2 | 10/2008 | Makinen | |
| 7,523,226 B2 | 4/2009 | Anderson et al. | |
| 7,574,469 B2 | 8/2009 | Lorencz | |
| 7,574,691 B2 | 8/2009 | Freitas et al. | |
| 7,716,273 B2 | 5/2010 | Soin et al. | |
| 7,840,509 B1 | 11/2010 | Messina | |
| 7,937,075 B2 | 5/2011 | Zellner | |
| 7,962,552 B2 | 6/2011 | Clark et al. | |
| 8,028,239 B1 | 9/2011 | Al-Hilali et al. | |
| 8,041,296 B2 | 10/2011 | Skog et al. | |
| 8,150,945 B2 | 4/2012 | Karaoguz et al. | |
| 8,161,403 B2* | 4/2012 | Lyle ..................... G06F 3/038 715/733 |
| 8,185,539 B1 | 5/2012 | Bhardwaj | |
| 8,194,037 B2 | 6/2012 | Kerr et al. | |
| 8,244,288 B2 | 8/2012 | Chipchase | |
| 8,354,997 B2 | 1/2013 | Boillot | |
| 8,418,072 B1 | 4/2013 | Bauer et al. | |
| 8,453,186 B2 | 5/2013 | Roberts et al. | |
| 8,462,896 B2 | 6/2013 | Suga et al. | |
| 8,504,936 B2 | 8/2013 | Gimpl et al. | |
| 8,515,413 B1 | 8/2013 | Schilit et al. | |
| 8,520,000 B2 | 8/2013 | Duncker et al. | |
| 8,520,810 B1 | 8/2013 | Reding et al. | |
| 8,538,324 B2 | 9/2013 | Hardacker et al. | |
| 8,538,401 B2 | 9/2013 | Kim et al. | |
| 8,549,425 B2 | 10/2013 | Sakamoto | |
| 8,711,552 B2 | 4/2014 | Medica | |
| 8,736,762 B2 | 5/2014 | Luo et al. | |
| 8,762,896 B2 | 6/2014 | Lee et al. | |
| 9,081,498 B2 | 7/2015 | Thorsander et al. | |
| 9,357,250 B1 | 5/2016 | Newman et al. | |
| 9,395,905 B2* | 7/2016 | Wherry ................. G06F 3/0485 |
| 9,405,459 B2 | 8/2016 | Sirpal et al. | |
| 9,448,811 B2 | 9/2016 | Culshaw et al. | |
| 9,678,640 B2 | 6/2017 | Stauber et al. | |
| 9,721,570 B1 | 8/2017 | Beal et al. | |
| 9,769,227 B2 | 9/2017 | Threlkeld et al. | |
| 9,860,306 B2 | 1/2018 | Threlkeld et al. | |
| 9,912,724 B2* | 3/2018 | Liu ..................... H04L 67/025 |
| 10,025,684 B2 | 7/2018 | Khoury et al. | |
| 2002/0054141 A1 | 5/2002 | Yen et al. | |
| 2002/0161891 A1 | 10/2002 | Higuchi et al. | |
| 2003/0018725 A1 | 1/2003 | Turner et al. | |
| 2003/0036927 A1 | 2/2003 | Bowen | |
| 2003/0055735 A1 | 3/2003 | Cameron et al. | |
| 2003/0055738 A1 | 3/2003 | Alie | |
| 2003/0164818 A1 | 9/2003 | Miller-smith | |
| 2003/0189597 A1 | 10/2003 | Anderson et al. | |
| 2003/0214458 A1 | 11/2003 | Giemborek et al. | |
| 2004/0002049 A1 | 1/2004 | Beavers et al. | |
| 2006/0010394 A1 | 1/2006 | Chaudhri et al. | |
| 2006/0203758 A1 | 9/2006 | Tee et al. | |
| 2006/0236255 A1 | 10/2006 | Lindsay et al. | |
| 2007/0004385 A1 | 1/2007 | Horvitz et al. | |
| 2007/0083911 A1 | 4/2007 | Madden et al. | |
| 2007/0113190 A1 | 5/2007 | Clark et al. | |
| 2007/0236475 A1 | 10/2007 | Wherry | |
| 2007/0299796 A1 | 12/2007 | Macbeth et al. | |
| 2008/0005693 A1 | 1/2008 | Oliver et al. | |
| 2008/0036743 A1* | 2/2008 | Westerman ............ G06F 3/038 345/173 |
| 2008/0080688 A1 | 4/2008 | Burgan et al. | |
| 2008/0084400 A1 | 4/2008 | Rosenberg | |
| 2008/0226119 A1 | 9/2008 | Candelore et al. | |
| 2008/0248834 A1 | 10/2008 | Chaterjee et al. | |
| 2008/0250408 A1 | 10/2008 | Tsui et al. | |
| 2008/0250424 A1 | 10/2008 | Brugiolo et al. | |
| 2008/0305742 A1 | 12/2008 | Basir | |
| 2009/0006660 A1 | 1/2009 | Bawcutt et al. | |
| 2009/0113346 A1 | 4/2009 | Wickramasuriya et al. | |
| 2009/0153288 A1 | 6/2009 | Hope et al. | |
| 2009/0170552 A1 | 7/2009 | Lin | |
| 2009/0207097 A1 | 8/2009 | Sherman et al. | |
| 2009/0231271 A1 | 9/2009 | Heubel et al. | |
| 2009/0307658 A1 | 12/2009 | Freitas et al. | |
| 2009/0322693 A1 | 12/2009 | Sasakura | |
| 2010/0060588 A1 | 3/2010 | Fong | |
| 2010/0064228 A1 | 3/2010 | Tsern | |
| 2010/0088100 A1 | 4/2010 | Lindahl | |
| 2010/0138780 A1 | 6/2010 | Marano et al. | |
| 2010/0211636 A1 | 8/2010 | Starkenburg et al. | |
| 2010/0299436 A1 | 11/2010 | Khalid et al. | |
| 2010/0304783 A1 | 12/2010 | Logan et al. | |
| 2011/0024691 A1 | 2/2011 | French et al. | |
| 2011/0033971 A1 | 2/2011 | Koo et al. | |
| 2011/0055774 A1 | 3/2011 | Kim et al. | |
| 2011/0066971 A1 | 3/2011 | Forutanpour et al. | |
| 2011/0126119 A1 | 5/2011 | Young et al. | |
| 2011/0130178 A1 | 6/2011 | Shin et al. | |
| 2011/0131291 A1 | 6/2011 | Hon-anderson | |
| 2011/0145817 A1 | 6/2011 | Grzybowski | |
| 2011/0154268 A1 | 6/2011 | Trent et al. | |
| 2011/0185369 A1 | 7/2011 | Huang | |
| 2011/0205159 A1 | 8/2011 | Gates et al. | |
| 2011/0214162 A1 | 9/2011 | Brakensiek et al. | |
| 2011/0221765 A1 | 9/2011 | Nason et al. | |
| 2011/0230178 A1 | 9/2011 | Jones et al. | |
| 2011/0231550 A1 | 9/2011 | Murray et al. | |
| 2011/0231796 A1 | 9/2011 | Vigil | |
| 2011/0231853 A1 | 9/2011 | Murray et al. | |
| 2011/0246891 A1 | 10/2011 | Schubert et al. | |
| 2011/0246904 A1 | 10/2011 | Pinto et al. | |
| 2011/0271198 A1 | 11/2011 | Brakensiek et al. | |
| 2011/0307841 A1 | 12/2011 | Boldyrev et al. | |
| 2011/0320535 A1 | 12/2011 | Donaldson | |
| 2012/0017147 A1 | 1/2012 | Mark | |
| 2012/0050183 A1 | 3/2012 | Lee | |
| 2012/0054648 A1 | 3/2012 | Morris | |
| 2012/0095643 A1 | 4/2012 | Bose et al. | |
| 2012/0096167 A1 | 4/2012 | Free et al. | |
| 2012/0173983 A1 | 7/2012 | Song | |
| 2012/0174155 A1 | 7/2012 | Mowrey et al. | |
| 2012/0176396 A1 | 7/2012 | Harper et al. | |
| 2012/0210266 A1 | 8/2012 | Jiang et al. | |
| 2012/0265528 A1 | 10/2012 | Gruber et al. | |
| 2012/0266079 A1 | 10/2012 | Lee et al. | |
| 2012/0274863 A1 | 11/2012 | Chardon et al. | |
| 2012/0282219 A1 | 11/2012 | Alexander | |
| 2012/0317236 A1 | 12/2012 | Abdo et al. | |
| 2013/0018659 A1 | 1/2013 | Chi | |
| 2013/0024778 A1 | 1/2013 | Reeves et al. | |
| 2013/0027315 A1 | 1/2013 | Teng | |
| 2013/0031261 A1 | 1/2013 | Suggs | |
| 2013/0050222 A1 | 2/2013 | Moran et al. | |
| 2013/0055102 A1 | 2/2013 | Matthews et al. | |

(56) References Cited

U.S. PATENT DOCUMENTS

| | | |
|---|---|---|
| 2013/0057572 A1 | 3/2013 | Anderson et al. |
| 2013/0066895 A1 | 3/2013 | Choi et al. |
| 2013/0070844 A1 | 3/2013 | Malladi et al. |
| 2013/0073932 A1 | 3/2013 | Migos et al. |
| 2013/0076591 A1 | 3/2013 | Sirpal et al. |
| 2013/0103770 A1 | 4/2013 | Kamolz et al. |
| 2013/0109371 A1 | 5/2013 | Brogan et al. |
| 2013/0113993 A1 | 5/2013 | Dagit, III |
| 2013/0132481 A1 | 5/2013 | Lee et al. |
| 2013/0135195 A1 | 5/2013 | Josephson et al. |
| 2013/0143529 A1 | 6/2013 | Leppanen |
| 2013/0151989 A1 | 6/2013 | Dent et al. |
| 2013/0167159 A1 | 6/2013 | Ricci et al. |
| 2013/0179838 A1 | 7/2013 | LeVee et al. |
| 2013/0187861 A1 | 7/2013 | Lavallee |
| 2013/0204967 A1* | 8/2013 | Seo ............... H04L 43/00 709/217 |
| 2013/0207898 A1 | 8/2013 | Sullivan et al. |
| 2013/0214996 A1 | 8/2013 | Reeves et al. |
| 2013/0218947 A1 | 8/2013 | Zur et al. |
| 2013/0258037 A1 | 10/2013 | Kim et al. |
| 2013/0276015 A1 | 10/2013 | Rothschild et al. |
| 2013/0276030 A1 | 10/2013 | Fujimoto |
| 2013/0278484 A1 | 10/2013 | Hwang et al. |
| 2013/0283193 A1 | 10/2013 | Griffin |
| 2013/0283213 A1 | 10/2013 | Guendelman et al. |
| 2013/0288603 A1 | 10/2013 | Iwasaki |
| 2013/0297547 A1 | 11/2013 | Ding et al. |
| 2013/0326583 A1 | 12/2013 | Freihold et al. |
| 2013/0328667 A1 | 12/2013 | Kumar et al. |
| 2013/0332172 A1 | 12/2013 | Prakash et al. |
| 2013/0332846 A1 | 12/2013 | Freedman |
| 2013/0335340 A1 | 12/2013 | Smith |
| 2013/0347018 A1 | 12/2013 | Limp et al. |
| 2014/0022192 A1 | 1/2014 | Hatanaka |
| 2014/0026068 A1 | 1/2014 | Park et al. |
| 2014/0028918 A1 | 1/2014 | Kim |
| 2014/0028921 A1 | 1/2014 | Moon et al. |
| 2014/0045433 A1 | 2/2014 | Kim |
| 2014/0051408 A1 | 2/2014 | Jenzowsky et al. |
| 2014/0098182 A1 | 4/2014 | Kramarenko et al. |
| 2014/0118222 A1 | 5/2014 | Barrett et al. |
| 2014/0129695 A1 | 5/2014 | Yerli |
| 2014/0164312 A1 | 6/2014 | Lynch et al. |
| 2014/0173529 A1 | 6/2014 | Hicks |
| 2014/0181639 A1 | 6/2014 | Lund et al. |
| 2014/0181715 A1 | 6/2014 | Axelrod et al. |
| 2014/0201636 A1 | 7/2014 | Freitas et al. |
| 2014/0215347 A1* | 7/2014 | Lin ............... G08C 17/02 715/740 |
| 2014/0218289 A1 | 8/2014 | Dai et al. |
| 2014/0229858 A1 | 8/2014 | Bleker et al. |
| 2014/0244266 A1 | 8/2014 | Brown et al. |
| 2014/0244712 A1 | 8/2014 | Walters et al. |
| 2014/0244782 A1 | 8/2014 | Beaurepaire et al. |
| 2014/0249821 A1 | 9/2014 | Kennewick et al. |
| 2014/0267074 A1 | 9/2014 | Balci et al. |
| 2014/0282103 A1* | 9/2014 | Crandall ............... H04L 65/403 715/753 |
| 2014/0304019 A1 | 10/2014 | Scott |
| 2014/0350936 A1 | 11/2014 | Kanai |
| 2014/0365336 A1 | 12/2014 | Hurewitz |
| 2015/0011277 A1 | 1/2015 | Wakeford et al. |
| 2015/0025976 A1 | 1/2015 | Guo et al. |
| 2015/0061842 A1 | 3/2015 | Yoon et al. |
| 2015/0066897 A1 | 3/2015 | Vronay et al. |
| 2015/0103015 A1 | 4/2015 | Berglund et al. |
| 2015/0138213 A1 | 5/2015 | Turner et al. |
| 2015/0169550 A1 | 6/2015 | Cvijetic et al. |
| 2015/0177860 A1 | 6/2015 | Imai |
| 2015/0234856 A1 | 8/2015 | Havekes et al. |
| 2015/0268807 A1 | 9/2015 | Truong et al. |
| 2015/0324067 A1 | 11/2015 | Cabral |
| 2015/0355715 A1 | 12/2015 | Smith |
| 2015/0355955 A1 | 12/2015 | Chakra et al. |
| 2015/0371364 A1 | 12/2015 | Park |
| 2015/0373065 A1 | 12/2015 | Holmquist et al. |
| 2016/0070461 A1 | 3/2016 | Herbordt et al. |
| 2016/0070580 A1 | 3/2016 | Johnson et al. |
| 2016/0085396 A1 | 3/2016 | Pendlay et al. |
| 2016/0085430 A1 | 3/2016 | Moran et al. |
| 2016/0085698 A1 | 3/2016 | Mikkola et al. |
| 2016/0086581 A1 | 3/2016 | Khoury et al. |
| 2016/0088040 A1 | 3/2016 | Threlkeld et al. |
| 2016/0088060 A1 | 3/2016 | Rahman et al. |
| 2016/0162151 A1 | 6/2016 | Xu |
| 2016/0261921 A1 | 9/2016 | Malko |
| 2016/0267546 A1 | 9/2016 | Marsh |
| 2018/0007104 A1 | 1/2018 | Threlked et al. |

FOREIGN PATENT DOCUMENTS

| | | |
|---|---|---|
| CN | 101101604 A | 1/2008 |
| CN | 101582053 A | 11/2009 |
| CN | 101981557 A | 2/2011 |
| CN | 102027450 A | 4/2011 |
| CN | 102176762 A | 9/2011 |
| CN | 102541546 A | 7/2012 |
| CN | 102725727 A | 10/2012 |
| CN | 102835068 A | 12/2012 |
| CN | 102866913 A | 1/2013 |
| CN | 102945149 A | 2/2013 |
| CN | 103412712 A | 11/2013 |
| CN | 103733170 A | 4/2014 |
| EP | 1942401 A1 | 7/2008 |
| EP | 2000894 A2 | 12/2008 |
| EP | 2509292 A1 | 10/2012 |
| EP | 2632131 A1 | 8/2013 |
| EP | 2701044 A1 | 2/2014 |
| EP | 2712152 A1 | 3/2014 |
| FR | 2996086 A1 | 3/2014 |
| JP | 2006127279 A | 5/2006 |
| JP | 2007179108 A | 7/2007 |
| JP | 2008244974 A | 10/2008 |
| JP | 2014063449 A | 4/2014 |
| RU | 2355121 C2 | 5/2009 |
| RU | 2405186 C2 | 11/2010 |
| RU | 2417391 C2 | 4/2011 |
| RU | 2011146922 A | 7/2013 |
| WO | 2009/143294 A2 | 11/2009 |
| WO | 2013012654 A | 1/2013 |
| WO | 2013112143 A1 | 8/2013 |
| WO | 2013/171487 A1 | 11/2013 |
| WO | 2013184394 A2 | 12/2013 |
| WO | 2014038918 A1 | 3/2014 |

OTHER PUBLICATIONS

Reply Written Opinion cited in PCT Application No. PCT/US2015/050690 dated Apr. 8, 2016, 8 pgs.
Second Written Opinion cited in PCT Application No. PCT/US2015/050690 dated May 27, 2016, 4 pgs.
Reply Written Opinion cited in PCT Application No. PCT/US2015/050838 dated 6124/2016, 23 pgs.
Reply Written Opinion cited in PCT Application No. PCT/US2015/050846 dated May 19, 2016, 25 pgs.
Reply Written Opinion cited in PCT Application No. PCT/US2015/050866 dated May 2, 2016, 20 pgs.
Reply Written Opinion cited in PCT Application No. PCT/US2015/051133 dated Jul. 22, 2016, 24 pgs.
Non-Final Office Action cited in U.S. Appl. No. 14/495,443 dated Aug. 26, 2016, 44 pgs.
Notice of Allowance cited in U.S. Appl. No. 14/495,376 dated Oct. 24, 2016, 19 pgs.
Restriction/Election Office Action cited in U.S. Appl. No. 14/495,355 dated Sep. 19, 2016, 7 pgs.
Second Written Opinion cited PCT Application No. PCT/US2015/050838 dated Sep. 6, 2016, 8 pgs.
Second Written Opinion cited in PCT Application No. PCT/US2015/050846 dated Aug. 22, 2016, 8 pgs.
Int. Preliminary Report cited in PCT Application No. PCT/US2015/050846 dated Nov. 3, 2016, 24 pgs.

(56) References Cited

OTHER PUBLICATIONS

Second Written Opinion cited in PCT/US2015/051133 dated Sep. 7, 2016, 31 pgs.
"International Search Report & Written Opinion Issued in PCT Application No. PCT/US2015/050664", dated Nov. 27, 2015, 13 Pages.
Thurrott, Paul, "Google I/O 2014: Android Takes the L", Published on: Jun. 25, 2014, pp. 11 Available at: http://winsupersite.com/mobile-devices/google-io-2014-android-takes-I.
"Considering CarPlay", Published on: Mar. 5, 2014, pp. 4 Available at: http://getwired.com/2014/03/05/considering-carplay/.
Piazza, et al., "Holy Smartphones and Tablets, Batman! Mobile Interaction's Dynamic Duo", In Proceedings of the 11th Asia Pacific Conference on Computer Human Interaction, Sep. 24, 2013, pp. 63-72, http://dl.acm.org/citation.cfm?id=2525205&preflayout=tabs.
Taylor, Nathan, "Multiple TV remotes showcase the evils of complexity. Smart TVs just make it worse", Published on: Jan. 13, 2014, pp. 4 Available at: http://praxtime.com/2014/01/13/multiple-remotes-evil/.
"The PadFone is not the future", Published on: Apr. 14, 2013, pp. 23 Available at: http://getwired.com/category/apple/ipad/.
"Chromecast", Retrieved on: Jul. 3, 2014, pp. 6 Available at: http://www.google.com/intl/en/chrome/devices/chromecast/.
"What is Ubuntu for Android?", Retrieved on: Jul. 3, 2014, pp. 9 Available at: http://www.ubuntu.com/phone/ubuntu-for-android.
Scheible, et al., "MobiToss: A Novel Gesture Based Interface for Creating and Sharing Mobile Multimedia Art on Large Public Displays", In Proceedings of Multimedia, Published on: Oct. 26, 2008, 4 Pages, http://www.mediateam.oulu.fi/publications/pdf/1131.pdf.
Dachselt, et al., "Throw and Tilt—Seamless Interaction across Devices Using Mobile Phone Gestures" In Proceedings of 2nd Workshop on Mobile and Embedded Interactive Systems, Published on: Sep. 11, 2008, pp. 7, http://old.hcilab.org/events/meis08/papers/meis08-paper11.pdf.
Chang, Alexandra, "Up close with iOS 5: New gestures" Published on: Oct. 14, 2011, pp. 5, available at: http://www.macworld.com/article/1163019/ios_5_new_gestures.html.
Int. Search Report/Written Opinion cited in PCT Application No. PCT/US2015/050690 dated Nov. 25, 2015, 10 pgs.
Int. Search Report/Written Opinion cited in PCT Application No. PCT/US2015/050838 dated Jan. 13, 2016, 14 pgs.
Int. Search Report/Written Opinion cited in PCT Application No. PCT/US2015/050846 dated Jan. 5, 2016, 12 pgs.
Int. Search Report/Written Opinion cited in PCT Application No. PCT/US2015/050866 dated Jan. 8, 2016, 14 pgs.
Int. Search Report/Written Opinion cited in PCT Application No. PCT/US2015/051133 dated Jan. 13, 2016, 14 pgs.
"In-Car Entertainment using Mobile Devices: A study on Automotive Manufactures in India", S. Solamalai and Dr. N.R.V. Prabhu, Jun. 30, 2014, In International journal of Engineering Science and Technology, vol. 2, No. 1, reprinted from the Internet at: http://www.estij.org/papers/vol2no12012/4vol2no1/pdf., pp. 26-29.
"Google Chromecast controls TV from smartphones, tablets, laptops", Jul. 24, 2013, reprinted from the Internet at: http://www.computerworld.com/article/2484298/tablets/google-chromecast-controls-tv-from-smartphones—tablets—laptops.htnnl, 5 pgs.
"Share Android Device Screen with Other Devices", Albert Tang, Dec. 17, 2012, reprinted from the Internet at: http://www.outube.com/watch?v=Ygng30ir1tc, 4 pgs.
"Kyocera's Echo phone bring dual-screens and "Simul-Taking" to Spring", Davindra Hardawar, Feb. 8, 2011, reprinted from the Internet at: http://venturebeat.com/2011/02/08/kyocera-echo/, 4 pgs.
"Design A for P2", Jan. 15, 2013, reprinted from the Internet at: http://boards.openpandora.org/topic./11608-design-a-for-p2, 6 pgs.
"OSX Mavericks Preview: Multiple displays finally Work Like they're supposed to", Peter Cohen, Jul. 8, 2013, reprinted from the Internet at: http://www.imore.com/os-x-mavericks-preview-multiple-displays, 8 pgs.
"Separate Back Stack for each tab in Android using Fragments", May 18, 2013, reprinted from the Internet at: http://stackoverflow.com/questions/6987334/separate-back-stack-for-each-tab-in-android-using-fragments, 15 pgs.
"Spring Echo—Dual-Screen Simul-tasking Phone", Feb. 10, 2011, reprinted from the Internet at: http://www.unp.me/f106/sprint-echo-dual-screen-simul-tasking-phone-139170/, 3 pgs.
"Creating Separate Back Stacks for Android Application Tabs using Fragments", Apr. 30, 2013, reprinted from the Internet at: http://www.abtosoftware.com/blog/creating-separate-back-stacks-for-android-apps-tabs-using-fragmentsm, 3 pgs.
"Providing Proper Back Navigation", May 18, 2013, reprinted from the Internet at: http://developer.android.com/training/implementing-navigation/temporal.html, 4 pgs.
"Building for Multiple Screens", Oct. 18, 2013, reprinted from the Internet at: http://techinfospace.com/2013/10/18/building-for-multiple-screens/, 5 pgs.
"User Interfaces When and Where They are Needed: An Infrastructure for Recombinant Computing", Mark W. Newman, Shahram Izadi, W. Keith Edwards, Jana Z. Sedivy and Trevor F. Smith, Oct. 27, 2002, In Proceedings of the 15th Annual ACM Symposium on User Interface Software and Technology, vol. 4, Issue 2, reprinted from the Internet at: http://mwnewman.people.si.umich.edu/pubs/uist2002-controllers.pdf, pp. 171-180.
"Multimodal user interfaces for context-aware mobile applications", Ralf Kernchen, Peter Pal Boda, Klaus Moessner, Bernd Mrohs, Matthieu Boussard and Giovanni Giuliani, Sep. 11, 2005, in IEEE 16th International Symposium on Personal, Indoor and Mobile Radio Communications, vol. 4, reprinted from the Internet at: ieeexplore.ieee.org/stamp/stamp.jsp?tp=&arnumber=1651849, 6 pgs.
"Stanford Interactive Workspaces: A Framework for Physical and Graphical User Interface Prototyping", Jan Borchers, Meredity Ringel, Joshua Tyler and Armando Fox, Dec. 2012, in IEEE Wireless Communication, reprinted from the Internet at: https://hci.stanford.edu/publications/2002/iwork_prototype_ieee/iRoom_SmartHomes_final.pdf, 7 pgs.
"Managing Context Information in Mobile Devices", Panu Korpipaa, Jani Mantyjarvi, Juha Kela, Heikki Keranen and Esko-Juhani Malm, Jul. 1, 2013, IEEE Pervasive Computing vol. 3, Issue 2, reprinted from the Internet at: http://140.127.22.92/download/learn_web/Tong(93-2)--Distribution_multimedia/database/6-7/Managing Context Information in Mobile Devices.pdf, pp. 42-51.
"Implicit Human Computer Interaction Through Context", Albrecht Schmidt, Jan. 1, 2000, personal Technologies, vol. 4, No. 2-3, 10 pgs.
"Design of human-centric adaptive multimodal interfaces", J. Kong, W.Y. Zhang, N. Yu and X.J. Xia, Jul. 28, 2011, International Journal of Human-Computer Studies, Academic Press, New York, N.Y., vol. 69, No. 12, 16 pgs.
"A Unifying Reference Framework for multi-target user interfaces", Gaelle Calvary, Joelle Coutaz, David Thevenin, Quentin Limbourg, Laurent Bouillon and Jean Vanderdoncki, Jun. 2003, Interacting with Computers, vol. 15, No. 3, pp. 289-308.
"Virtual Projection: Exploring Optical Projection as a Metaphor for Multi-Device Interaction", Dominikus Baur, Sebastian Boring and Steven Feiner, May 5, 2012, Proceedings of the SIGCHI Conference on Human Factors in Computing Systems, pp. 1693-1702.
"Extending Mobile Interfaces with External Screens", Julian Seifert, Dennis Schneider and Enrico Rukzio, Sep. 2, 2013, In Proceedings of International Federation for Information Processing, reprinted from the Internet at: https://www.uni-ulm.de/fileadmin/website_uni_ulm/iui.inst.100/institut/Papers/Prof_Rukzio/2013/2013-Seifert-et-al_ExtendingMobileInterfaces.pdf, 8 pgs.
"PDSs and Shared Public Displays: Making Personal Information Public, and Public Information Personal", Saul Greenberg, Michael Boyle and Jason Laberge, Jun. 30, 2014, In Proceedings of Personal Technologies, vol. 3, Issue 1-2, reprinted from the Internet at: http://grouplab.cpsc.ucalgary.ca/grouplab/uploads/Publications/Publications/1999-PDAs.PersonalTechnologies.pdf, pp. 54-64.
"Attach me, Detach me, Assemble me like You Work", Donatien Grolauz, Jean Vanderdonckt and Peter Van Roy, Sep. 12, 2005, In Proceedings of Human-Computer Interaction-INETERACT, reprinted from the Internet at: http://www.google.com/url?sa=t&rct=j&q=

(56) References Cited

OTHER PUBLICATIONS 8,esrc=s&source=web&cd=2&ved=0ah UKEwjkmdvYku7LAhWIQyYKHXCHCE8QFggmMAE&url=http%3A%2F%2Fwww.usixml.org%2Fservlet%2FRepository%2Fgrolaux-Interact2005.pdf%3FID%3D1413%26saveFile%3Dtrue&usg=AFQCNF5aeyzdb1MNCmTIMQvIOuJ4rLECA, 14 pgs.

"A Cross-Device Interaction Style for Mobiles and Surfaces", Donomik Schmidt, Julian Seifert, Enrico Rukzio and Hans Gellersen, Jun. 11, 2012, In Proceedings of the Designing Interactive Systems Conference, reprinted from the Internet at: https://www.uni-ulm.de/fileadmin/website_uni_ulm/iui.inst.100/institut/Papers/Prof_Rukzio/2012-Schmidt-D-A-Cross-Device-Interaction-Style-for-Mobiles-and-Surfaces.pdf, pp. 318-327.

"SlingPlayer for Connected Devices", Jun. 25, 2014, reprinted from the Internet at: http://forms.sling.com/go/spcd, 3 pgs.

"Second Written Opinion Issued in PCT Application No. PCT/US2015/050664", dated Sep. 19, 2016, 5 Pages.

"Bimodal tablets (Windows and Android)", Retrieved From: http://getwired.com/2014/01/05/binnodal-tablets-windows-and-android-remember-them-when-theyre-gone-again/, Jan. 14, 2005, 23 Pages.

"iDisplay: extra monitor for your Mac or PC", Retrieved From: https://web.archive.org/web/20160110104523/http://www.getdisplay.com/, Nov. 1, 2013, 3 Pages.

"In every dual-core phone, there's a PC trying to get out", Retrieved From: https://web.archive.org/web/20130417120250/https://www.ubuntu.com/phone/ubuntu-for-android, Retrieved Date: Sep. 25, 2013, 8 Pages.

"Microsoft SMB Protocol Packet Exchange Scenario", Retrieved From http://web.archive.org/web/20120731231956/https://msdn.microsoft.com/en-us/library/windows/desktop/aa365236(v=vs.85).aspx, Jul. 31, 2012, 3 Pages.

"Touch Mouse—iPhone/iPod Touch", Retrieved From: https://www.youtube.com/watch?v=iC17iKv91GE, Feb. 1, 2010, 5 Pages.

"Xperia Z: Experience the best of Sony in a smartphone", Retrieved From:http://www.sony.com.au/microsite/xperia-z/?, Feb. 17, 2013, 11 Pages.

"Final Office Action Issued in U.S. Appl. No. 14/481,821", dated May 9, 2017, 17 Pages.

"Final Office Action Issued in U.S. Appl. No. 14/481,821", dated Jul. 3, 2018, 21 Pages.

"Non Final Office Action Issued in U.S. Appl. No. 14/481,821", dated Feb. 9, 2018, 18 Pages.

"Non-Final Office Action Issued in U.S. Appl. No. 14/481,821", dated Aug. 12, 2016, 16 Pages.

"Final Office Action Issued in U.S. Appl. No. 14/495,122", dated Mar. 30, 2018, 16 Pages.

"Final Office Action Issued in U.S. Appl. No. 14/495,122", dated Apr. 11, 2018, 16 Pages.

"Non-Final Office Action Issued in U.S. Appl. No. 14/495,122", dated Oct. 25, 2016, 14 Pages.

"Non-Final Office Action Issued in U.S. Appl. No. 14/495,122", dated Sep. 14, 2017, 15 Pages.

"Final Office Action Issued in U.S. Appl. No. 14/495,158", dated May 5, 2017, 11 Pages.

"Final Office Action Issued in U.S. Appl. No. 14/495,158", dated Jul. 20, 2018, 20 Pages.

"Non Final Office Action Issued in U.S. Appl. No. 14/495,158", dated Dec. 14, 2017, 16 Pages.

"Non Final Office Action Issued in U.S. Appl. No. 14/495,158", dated Oct. 12, 2016, 13 Pages.

"Non-Final Office Action Issued in U.S. Appl. No. 14/495,181", dated Mar. 2, 2017, 19 Pages.

"Final Office Action Issued in U.S. Appl. No. 14/495,268", dated Jun. 26, 2017, 18 Pages.

"Final Office Action Issued in U.S. Appl. No. 14/495,268", dated Jul. 25, 2018, 17 Pages.

"Non Final Office Action Issued in U.S. Appl. No. 14/495,268", dated Jan. 2, 2018, 17 Pages.

"Non-Final Office Action Issued in U,S. Appl. No. 14/495,268", dated Dec. 16, 2016, 16 Pages.

"Final Office Action Issued in U.S. Appl. No. 14/495,299", dated Jan. 27, 2017, 28 Pages.

"Final Office Action Issued in U.S. Appl. No. 14/495,299", dated Nov. 30, 2017, 24 Pages.

"Non-Final Office Action Issued in U.S. Appl. No. 14/495,299", dated Jun. 30, 2017, 30 Pages.

"Non-Final Office Action Issued in U.S. Appl. No. 14/495,299", dated Sep. 9, 2016, 24 Pages.

"Final Office Action Issued in U.S. Appl. No. 14/495,355", dated Nov. 14, 2017, 11 Pages.

"Non-Final Office Action Issued in U.S. Appl. No. 14/495,355", dated Feb. 2, 2017, 12 Pages.

"Non-Final Office Action Issued in U.S. Appl. No. 14/495,420", dated Nov. 9, 2016, 23 Pages.

"Final Office Action Issued in U.S. Appl. No. 14/495,443", dated Apr. 6, 2017, 38 Pages.

"Final Office Action Issued in U.S. Appl. No. 14/495,443", dated Jan. 25, 2018, 42 Pages.

"Non Final Office Action Issued in U.S. Appl. No. 14/495,443", dated Jul. 27, 2017, 40 Pages.

"Office Action Issued in European Patent Application No. 15775022.5", dated Jun. 22, 2018, 8 Pages.

"Office Action Issued in European Patent Application No. 15775852.5", dated Apr. 5, 2018, 5 Pages.

"Second Written Opinion Issued in PCT Application No. PCT/US2015/050319", dated May 27, 2016, 8 Pages.

"International Preliminary Report on Patentability Issued in PCT Application No. PCT/US2015/050690", dated Dec. 1, 2016, 6 Pages.

"International Preliminary Report on Patentability Issued in PCT Application No. PCT/US2015/050838", dated Dec. 12, 2016, 8 Pages.

"International Preliminary Report on Patentability Issued in PCT Application No. PCT/US2015/050866", dated Jan. 11, 2017, 13 Pages.

"Second Written Opinion Issued in PCT Application No. PCT/US2015/050866", dated Aug. 1, 2016, 8 Pages.

"International Preliminary Report on Patentability Issued in PCT Application No. PCT/US2015/051128", dated Dec. 19, 2016, 8 Pages.

"International Search Report & Written Opinion Issued in PCT Application No. PCT/US2015/051128", dated Dec. 2, 2015, 11 Pages.

"Second Written Opinion Issued in PCT Application No. PCT/US2015/051128", dated Sep. 5, 2016, 6 Pages.

"International Preliminary Report on Patentability Issued in PCT Application No. PCT/US2015/051133", dated Dec. 2, 2016, 12 Pages.

"Response to Written Opinion Filed in PCT Application No. PCT/US2015/080846", Filed Date: May 19, 2016, 25 Pages.

Suk, et al."Distributed Speech Recognition System for PDA in Wireless Network Environment", In Proceedings of the 9th Conference on Speech and Computer, Sep. 20, 2004, 4 Pages.

Tahir, et al."ARemote: A Tangible Interface for Selecting TV Channels", In Proceedings of the IEEE 17th International Conference on Artificial Reality and Telexistence, Nov. 28, 2007, pp. 298-299.

Wang, et al."Dynamic Cloud Resource Reservation via Cloud Brokerage", In Proceedings of the IEEE 33rd International Conference on Distributed Computing Systems, Jul. 8, 2013, pp. 400-409.

"Office Action Issued in European Patent Application No. 15775856.6", dated May 29, 2018, 6 Pages.

Cass, Stephen, "Big Fridge is Watching you [Smart Technologies Monitoring Food from Production to Consumption]", In Proceedings of the Spectrum, IEEE vol. 50 , Issue 6, Jun. 1, 2013, 1 Page.

Ciprian, Rusen, "How to Work With Network Drives & Network Locations", Retrieved From https://www.howtogeek.com/school/windows-network-sharing/lesson8/, Apr. 16, 2014, 25 Pages.

Dachis, Adam, "How to Automatically Unlock Your Gadgets Without a Password", Retrieved From: https://lifehacker.com/how-to-make-your-smartphone-automatically-unlock-your-s-510592193, Jun. 3, 2013, 9 Pages.

(56) References Cited

OTHER PUBLICATIONS

Etherington, Darrell, "Mosaic Lets You Weave a Single Display From Multiple iPhones and iPads, Offers SDK for Developers", Retrieved From: https://techcrunch.com/2013/04/02/mosaic-lets-you-weave-a-single-display-from-multiple-iphones-and-ipads-offers-sdk-for-developers/, Apr. 2, 2013, 7 Pages.
Heape, Judd, "Driving an External Monitor from Handhelds", In Proceedings of the EE Times—India, Mar. 2008, 2 Pages.
Menoo, Schoone, "Sharing files with a mapped network drive", Retrieved From http://www.optimizingpc.com/miscellaneous/sharing_files_shared_folder.html, Feb. 1, 2012, 4 Pages.
"International Preliminary Report on Patentability Issued in PCT Application No. PCT/US2015/048748", dated Oct. 6, 2016, 8 Pages.
"International Search Report & Written Opinion Issued in PCT Application No. PCT/US2015/048748", dated Dec. 11, 2015, 14 Pages.
"Second Written Opinion Issued in PCT Application No. PCT/US2015/048748", dated Jul. 4, 2016, 7 Pages.
"International Preliminary Report on Patentability Issued in PCT Application No. PCT/US2015/050317", dated Dec. 6, 2016, 7 Pages.
"International Search Report and Written Opinion Issued in PCT Application No. PCT/US2015/050317", dated Feb. 16, 2016, 24 Pages.
"Second Written Opinion Issued in PCT Application No. PCT/US2015/050317", dated Aug. 18, 2016, 6 Pages.
"International Preliminary Report on Patentability Issued in PCT Application No. PCT/US2015/050319", dated Jul. 18, 2016, 10 Pages.
"International Search Report & Written Opinion Issued in PCT Application No. PCT/US2015/050319", dated Dec. 3, 2015, 10 Pages.
"Notice of Allowance Issued in Russian Patent Application No. 2017109690", dated Apr. 17, 2019, 25 Pages.
"Office Action Issued in Japanese Patent Application No. 2017-511244", dated Jun. 5, 2019, 8 Pages.
"Office Action Issued in European Patent Application No. 15775848.3", dated Jun. 7, 2019, 4 Pages.
"Office Action Issued in European Patent Application No. 15779062/", dated Mar. 15, 2019, 08 Pages.
"Notice of Allowance Issued in Russian Patent Application No. 2017109699", dated Mar. 6, 2019, 21 Pages.
"Office Action Issued in Russian Patent Application No. 2017109689", dated Apr. 3, 2019, 05 Pages (w/o English Translation).
"Non Final Office Action Issued in U.S. Appl. No. 16/016,244", dated Mar. 25, 2019, 09 Pages.
"Office Action Issued in European Patent Application No. 15775851.7", dated May 9, 2019, 6 Pages.
"Non Final Office Action Issued in U.S. Appl. No. 14/495,158", dated Dec. 20, 2018, 20 Pages.
"Final Office Action Issued in U.S. Appl. No. 14/495,268", dated Jan. 10, 2019, 16 Pages.
"Non Final Office Action Issued in U.S. Appl. No. 14/481,821", dated Mar. 7, 2019, 23 Pages.
"Office Action Issued in Chinese Patent Application No. 201580051879.5", dated May 29, 2019, 42 Pages.
"Office Action Issued in Chinese Patent Application No. 201580051821.0", dated May 22, 2019, 8 Pages.
"Office Action Issued in Chinese Patent Application No. 201580051897.3", dated May 23, 2019, 15 Pages.
"Office Action Issued in Chinese Patent Application No. 201580051951.4", dated May 22, 2019, 17 Pages.
"Office Action Issued in Chinese Patent Application No. 201530051980,0", dated May 24, 2019, 34 Pages.
"Non Final Office Action issued in U.S. Appl. No. 14/495,268", dated May 31, 2019, 16 Pages.
"Office Action Issued in European Patent Application No. 15775022.5", dated Jan. 16, 2019, 7 Pages.
"Office Action Issued in European Patent Application No. 15775852.5", dated Feb. 19, 2019, 6 Pages.
"Office Action Issued in Japanese Patent Application No. 2017-515807", dated Aug. 16, 2019, 4 Pages.
"First Office Action and Search Report Issued in Chinese Patent Application No. 201580051788.1", dated Jul. 29, 2019, 27 Pages.
"Office Action Issued in European Patent Application No. 15775857.4", dated Aug. 19, 2019, 8 Pages.
"Office Action Issued in Japanese Patent Application No. 2017511247", dated Jul. 9, 2019, dated Jul. 4, 2019, 8 Pages.
"Office Action Issued in Japanese Patent Application No. 2017511247", dated Jul. 9, 2019, 8 Pages.
"Non Final Office Action Issued in U.S. Appl. No. 14/495,443", dated Aug. 19, 2019, 24 Pages.
"Final Office Action Issued in U.S. Appl. No. 14/495,443", dated Nov. 18, 2019, 26 Pages.
"Final Office Action Issued in U.S. Appl. No. 14/495,268", dated Oct. 4, 2019, 18 Pages.
"Final Office Action issued in U.S. Appl. No. 16/016,244", dated Oct. 31, 2019, 9 Pages.
"Second Office Action and Search Report Issued in Chinese Patent Application No. 201580051821.0", dated Sep. 30, 2019, 10 Pages.
"Office Action Issued in Mexican Patent Application No. MX/a/2017/003837", dated Oct. 14, 2019, 4 Pages.
"Second Office Action Issued in Chinese Patent Application No. 201580051951.4", dated Oct. 9, 2019, 8 Pages.
"Second Office Action Issued in Chinese Patent Application No. 201580051951.4", dated Oct. 9, 2019, 22 Pages.
"Office Action Issued in Mexican Patent Application No. MX/a/2017/003839", dated Oct. 4, 2019, 4 Pages.
"Notice of Allowance Issued in Japanese Patent Application No. 2017-511244", dated Sep. 3, 2019, 5 Pages.
Good, Shiroi, "Close Up", Published in Nikkei Computer, vol. 719, Dec. 15, 2008, pp. 104-107.
"Office Action Issued in Mexican Patent Application No. MX/a/2017/003838", dated Oct. 4, 2019, 4 Pages.
"Office Action Issued in Eurpoean Patent Application No. 15775852.5", dated Oct. 23, 2019, 5 Pages.
"First Office Action and Search Report Issued in Chinese Patent Application No. 201580051898.8", dated Dec. 16, 2019, 14 Pages.
"First Office Action and Search Report Issued in Chinese Patent Application No. 201580051899.2", dated Dec. 30, 2019, 26 Pages.
"Second Office Action Issued in Chinese Patent Application No. 201580051980.0", dated Jan. 15, 2020, 41 Pages.
"Notice of Allowance issued in Japanese Patent Application No. 2017-511247", dated Feb. 17, 2020, 5 Pages.

\* cited by examiner

PARTITIONED APPLICATION PRESENTATION ACROSS DEVICES

BACKGROUND

Within the field of computing, many scenarios involve an interaction of a user with a device (e.g., a workstation, a laptop, a mobile phone, a tablet, and a media server) that presents a computing environment, and that allows the user to instantiate and utilize an application within the computing environment (e.g., a document editor, a media player, an email client, a web browser, or a game). The user may utilize a variety of such devices, each presenting a different computing environment, to interact with such applications. The user may also extend a logical size of the computing environment by adding an additional display and display adapter, which may enable the user to interact with a large view of one application, or to interact with the views of several concurrently displayed applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A user of a device may be interested in utilizing the resources of a second device in the presentation of a computing environment. Many such techniques may be able the user to do so, such as initiating a terminal services session that deploys a view of the computing environment from the primary device to the auxiliary device; initiating a display mirroring session from the primary device to the auxiliary device; and installing an application on the primary device and the secondary device that are capable of interoperating. However, each such technique may exhibit a number of disadvantages. As a first such example, a terminal services session may allow the user to view the computing environment remotely, but the terminal services server and the target services client do not typically utilize the resources of both devices to provide an integrated view of the computing environment; rather, a secondary view of the same computing environment is simply remotely presented. Additionally, the remote presentation of the primary computing environment may not reflect the device properties of the second device. As a second such example, a display mirroring session may enable a user to replicate a view of the computing environment on a second display, such as a projector; however, this scenario does not result in an integration of the resources of the projector with the computing environment, but simply rebroadcasts the same display on two devices. As a third such example, some applications installed on multiple devices may enable each device to participate together in the application, but such techniques may involve a significant amount of configuration, and may achieve the integration of the devices only for the selected application. Additionally, a second device may present a significantly different computing environment, and inconsistencies between the primary computing environment of the primary device and the computing environment of the second device may result in considerable discrepancies in terms of available functionality, compatibility, and user interface behavior.

Presented herein are techniques for enabling a primary device of a user to utilize the resources of an auxiliary device in the presentation of an application within a primary computing environment. In accordance with such techniques, the primary device may execute the application locally on a processor, but may partition the application into a primary application portion and an auxiliary application portion. The primary device may present the primary application portion within the primary computing environment of the primary device, but may insert the auxiliary application portion into an auxiliary computing environment adapted from the primary computing environment according to a device property of the auxiliary device, and transmit the auxiliary computing environment including the auxiliary application portion to the auxiliary device for presentation to the user. The partitioning of the application across the primary computing environment (presented by the primary device) and the auxiliary computing environment adapted from the primary computing environment (and presented by the auxiliary device) may enable a user experience that both utilizes the particular device properties of the auxiliary device, and also provides a consistent execution and presentation of the application. In some embodiments, user input may be provided through either or both devices in order to interact with the application presented across both devices; and in some embodiments, the primary device may variably display a portion of the same application or a different application at the request of the user. In some embodiments, particular gestures may be recognized that, when performed by the user on the primary device (e.g., upon a touch-sensitive display of the primary device), invoke various operations on the auxiliary device. Many such features may be achievable through the configuration of the primary device and/or the auxiliary device in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
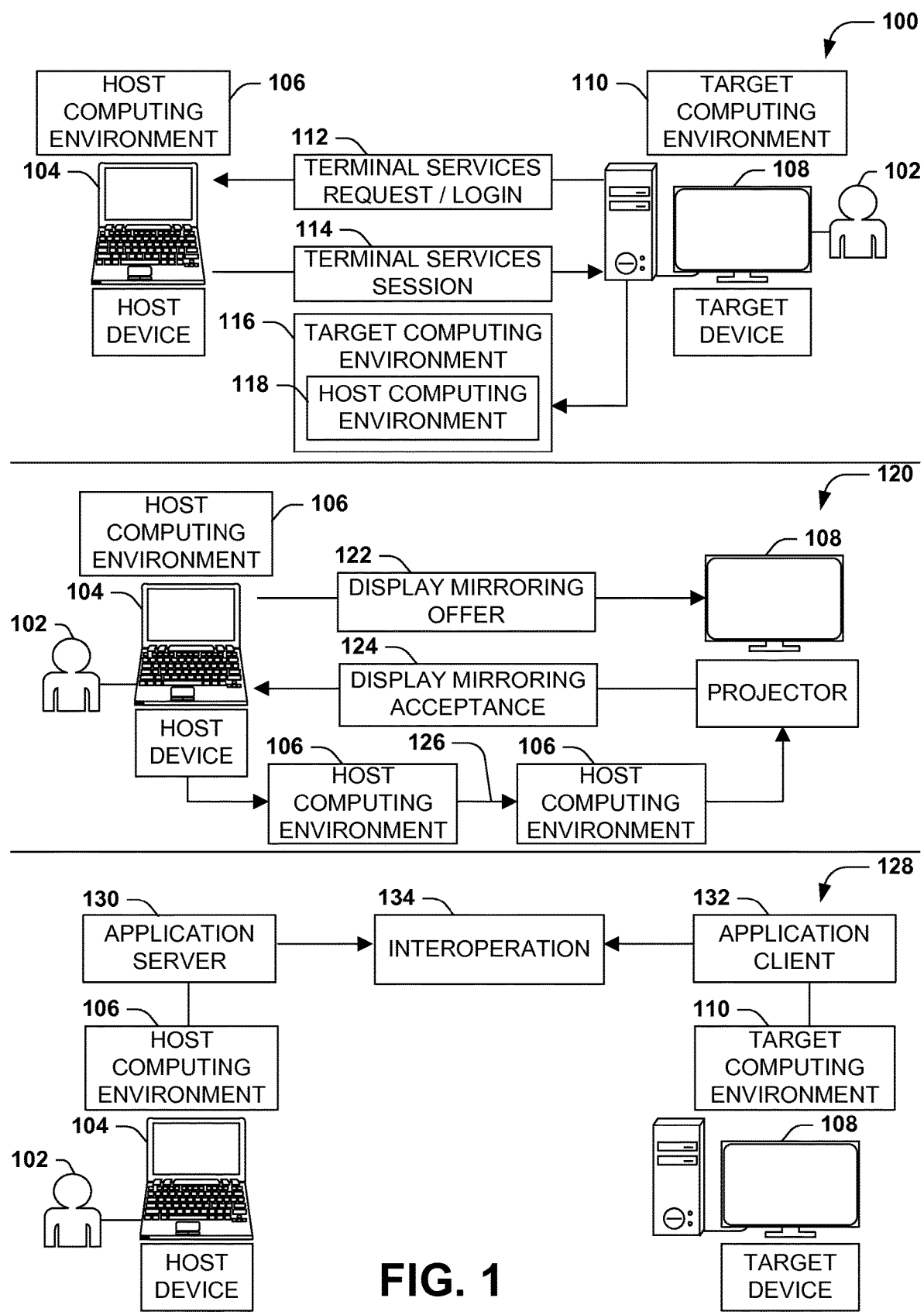
FIG. 1 is an illustration of an example scenario featuring various techniques for enabling an interoperation of two devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of a set of example scenarios in which a user 102 of a host device 104 endeavors to utilize the resources of a target device 108 with a host computing environment 106 of the host device 104. For example, the user 102 may have acquired a host device 104, such as a laptop computer or a mobile phone, that is portable and may be utilized in a variety of locations and circumstances. However, such portability may entail a limitation of some resources of the host device, such as a reduced display size, lower-fidelity and/or lower-power speakers, a small and/or condensed keyboard, and a fixed pointing device, such as a touchpad. When the user 102 is in the vicinity of a second device, the user 102 may be interested in expanding the presentation of the host computing environment 106 to incorporate various resources of the second device, such as a larger display of a television; a higher-fidelity and/or higher-power set of speakers; a full-size keyboard and a high-performance mouse; and a more robust set of peripheral components, such as a camera, a printer, and a scanner.

In view of such interests, the user 102 may utilize a variety of techniques to expand a host computing environment 106 of the host device 104 to utilize some resources of a target device 108. A first example scenario 100 presented in FIG. 1 involves a terminal services session 114, wherein the host device 104, acting as a terminal services server, is capable of deploying a remote view of the host computing environment 106 within the target computing environment 110 of the target device 108. The host device 104 may therefore generate a terminal computing environment, such as a single user account providing operating system settings, a single set of application 212 and application configurations, and a single set of files 114 and hardware components that are accessible to the host device 104. The user 102 may initiate a terminal services request 112 form the target device 108, and the host device 104 may fulfill the terminal services request 12 by initiating a terminal services session 114, wherein the terminal server 118 transmits a remote view 118 of the host computing environment 106 to the target device 108 (e.g., transmitting video of the host computing environment 106 to the target device 108, and receiving user input directed to the remotely presented view on the target device 108 that is applicable to an application within the host computing environment 106). In this manner, the user 102 may interact with the remote view 118 of the host computing environment 106 within the target computing environment 116 of the target device 108.

However, such terminal services techniques may exhibit further limitations. For example, the presentation of the terminal services session 114 on the target device 108 may provide in a suboptimal experience if the remote view 118 is presented without to device properties of the target device 108. As a first such example, the remote view 118 may exhibit various visual settings of the host computing environment 106, such as a color scheme, icon and font sizes and styles, and a desktop resolution, that are suitable for the host device 104, but that are not suitable for the target device 108. As a second such example, the target device 108 may feature a set of device properties, such as a camera, but the remote view 118 of the host computing environment 118 may not incorporate and expose the device properties of the target device 108 (e.g., because the terminal services client running on the target device 108 may not solicit and/or utilize such information, or because the host computing environment 106 does not have adequate support for such components).

A second example scenario 120 presented in FIG. 1 involves a user 102 initiating a mirroring session of the host computing environment 106 from the host device 104 to a target device 108 such as a projector. The host device 104 may transmit a display mirroring offer 122 to the target device 108, and, upon receiving an acceptance 124, may begin transmitting 126 the host computing environment 106 to the target device 108, which may display the host computing environment 106. While such techniques enable the use of the target device 108 to display the host computing environment 106, the target device 108 is not particularly integrated with the host computing environment 106; e.g., the host computing environment 106 may not represent the target device 108 as an available resource, and may not enable a configuration or setting of properties. Additionally, the presentation of the host computing environment 106 may not be adapted for the target device 108. If the host device 104 is a mobile device with a small display, and the target device 108 is a large television device, the objects of the host computing environment 106 may appear oversized in the mirrored presentation, as such elements may be adapted for touch interaction that is not applicable to the presentation on the target device 108. Conversely, if the host device 104 is a large display and the target device 108 is a small display, the icons and fonts presented on the host computing environment 106 may be condensed to the point of inscrutability on the target device 108. Moreover, the target device 108 may include components that are not integrated with the host computing environment 106, and therefore neither represented in nor usable with the host computing environment 106.

A third example scenario 128 presented in FIG. 1 involves the selection of a distributed application that, if executed on separate devices, enables such devices to interoperate 134 to present a combined experience. For example, the user 102 may configure the host device 104 with an application server 130 and the target device 108 with an application client 132, such that when the respective components of the application are executed on each device, the applications unify the devices to provide a combined experience. For example, a database server executing on the host device 130 may be concurrently accessed by a first application client executing on the host device 104 and a second application client executing on the target device 108, such that both devices provide a view of the same data, and such that updates to the database through either device are reflected on the other device. While such distributed applications may facilitate the intent of the user 102 to utilize the resources of both devices to present the application, this scenario involves extensive configuration of each device, and is only usable for applications that feature such functionality. Moreover, the experience of interacting with the application may differ on each device, due to differences in available hardware (e.g., a touch-sensitive display vs. a mouse for pointer input) and/or device behavior (e.g., if the devices utilize different operating environments, the application may respond to different keyboard shortcuts, and may exhibit a different appearance), and issues such as compatibility may limit the user experience. Many such limitations may arise among various architectural techniques for sharing an application across a set of devices.

B. Presented Techniques

Presented herein are techniques for sharing an application across at least two devices, such as a primary device of a user 102, and an auxiliary device that the user 102 wishes to integrate with the primary device. The auxiliary device may comprise, e.g., a second device of the user 102, which the user 102 wishes to integrate temporarily (e.g., only for a brief presentation of the application) or persistently; a device of another individual; or a publicly accessible device presenting resources that are available for integration with primary devices.

In accordance with the techniques presented herein, for a locally executing application, the primary device may partition the application into a primary application portion and an auxiliary application portion. The primary device may locally present the primary application portion (e.g., using a display and/or speakers) of the primary device, and may insert the auxiliary application portion into an auxiliary computing environment that is adapted from the primary computing environment according to a device property of the auxiliary device. The primary device may then transmit the auxiliary computing environment, including the auxiliary application portion of the application, to the auxiliary device for presentation to the user 102.

Figure 2:
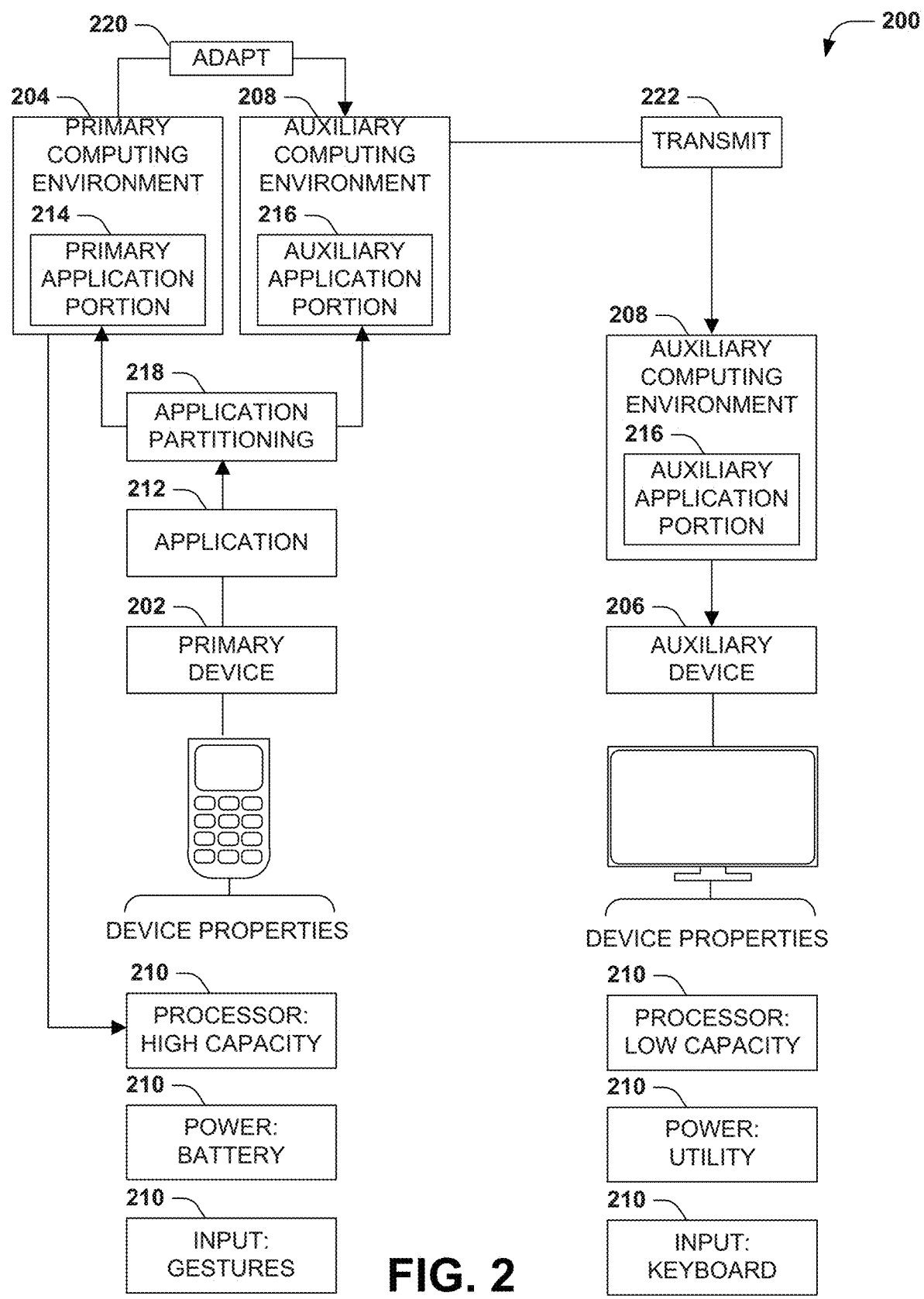
FIG. 2 is an illustration of an example scenario featuring a presentation of an application partitioned across a primary device and a secondary device, in accordance with the techniques presented herein.

FIG. 2 presents an illustration of an example scenario 200 featuring a partitioning of an application 212 between a primary device 202 and an auxiliary device 206 in accordance with the techniques presented herein. In this example scenario 200, the primary device 202 features a primary computing environment 204. The primary device 202 and auxiliary device 206 exhibit various device properties 210, such as processor capacity and architecture, power source and capacity (battery vs. a utility line), input devices (e.g., touch gestures vs. a keyboard and mouse); output devices (e.g., low-volume speaker vs. high-powered, high-fidelity speaker set), communications capabilities (e.g., a limited-capacity cellular data connection, a personal area network (PAN) adapter, a WiFi adapter and connection, or a wired Ethernet connection), and access to various peripheral devices (e.g., network-attached storage (NAS), printers, and scanners).

In this example scenario 200, the user 102 of the primary device 202 that is locally executing an application 212 may wish to present the application 212 across the primary computing environment 204 of the primary device 202 and the auxiliary device 206. Accordingly, the primary device 202 may partition 218 the application 212 into a primary application portion 214 to be presented on the primary device 202, and an auxiliary application portion 216 to be presented on the auxiliary device 206. More particularly, the auxiliary application portion 216 may be presented within an auxiliary computing environment 208 that has been deployed to the auxiliary device 206, and that has been adapted from the primary computing environment 204 according to one or more device properties 210 of the auxiliary device 206. For example, whereas the primary computing environment 204 features a color scheme, icon and font sizes, and user interface controls that are sized and configured for the input capabilities of the primary device 202, the auxiliary computing environment 204 may be adapted 220 feature a different color scheme, different icon and font sizes, and differently configure user interface controls that are suitable for presentation on the auxiliary device 206. Additionally, the primary device 202 may partition 218 the application 212 into the primary application portion 214 and the auxiliary application portion 216, e.g., by allocating distinct portions of the user interface of the application 212 to each computing environment. The primary device 202 may present the primary application portion 214 within the primary computing environment 204, and may transmit 222 the auxiliary computing environment 208, including the auxiliary application portion 216, to the auxiliary device 206, for presentation to the user 102. For example, the transmission 222 may involve transmitting an audio and video stream to the auxiliary device 206, and, if the auxiliary device 206 has input capabilities, transmitting user input received through such input capabilities back to the primary device 202, for application to the application 212 by the primary device 202. In this manner, the user 102 may achieve a coordinated presentation of the application 212 across the primary device 202 and the auxiliary device 206 in accordance with the techniques presented herein.

C. Technical Effects

The use of the techniques presented herein to present an application across a primary device 202 and an auxiliary device 206 may result in a variety of technical effects.

As a first example of a technical effect that may be achievable by the techniques presented herein, the deployment of the application 212 to the auxiliary device 206 may enable the integration of the resources of the auxiliary device 206 with those of the primary device 202 while presenting the application 212. For example, user input to the application 212 may be received through input components of the primary device 202 and/or the auxiliary device 206, and output may be presented through the combined output capabilities of the primary device 202 and the auxiliary device 206.

As a second example of a technical effect that may be achievable by the techniques presented herein, the distribution of the auxiliary application portion 216 to the auxiliary device 206, while the application 212 is executed by the primary device 202, may enable a distribution of the application 212 in a manner that is not dependent upon or undesirably affected by the architecture of the auxiliary device 206. For example, as long as the auxiliary device 206 is capable of receiving the transmission 222 of the auxiliary computing environment 208 and presenting the auxiliary computing environment 208 including the auxiliary application portion 216, the compatibility of the application 212 with the auxiliary device 206 may not affect the execution of the application (e.g., the application 212 may be incompatible with the instruction set architecture of the auxiliary device 206, but may nevertheless be presented thereupon, as the execution of the application 212 is achieved by the primary device 202). Moreover, the consistency of the auxiliary computing environment 208 may be preserved while presenting the auxiliary application portion 216 across auxiliary device 206. The execution of the application 212 and the adaptation of the auxiliary computing environment 208 from the primary computing environment 204 by the primary device 202 may utilize a shared set of files and resources of the primary device 202, and the presentation may therefore remain consistent across auxiliary devices 206 that natively utilize different instruction set architectures, operating systems, or software platforms or resources. That is, other than differences that are selected according to the adaptation 220 of the auxiliary computing environment 208 to the device properties 210 of the auxiliary device 206, the user experience of the auxiliary application portion 216 may remain consistent among auxiliary devices 206.

As a third example of a technical effect that may be achievable by the techniques presented herein, the presentation of the application 212 within an auxiliary computing environment 208 that is adapted for the device properties 210 of the auxiliary device 206 may enable a more suitable presentation of the user interface than displaying the application 212 in a device-property-agnostic manner. As a first such example, adapting the sizes and resolutions of icons and fonts for the display properties of the auxiliary device 206 may provide a suitable visual experience, whereas presenting the auxiliary application portion 216 without such adaptations may lead to undesirably oversized or undersized visual elements when presented by the auxiliary device 206. As a second such example, if the network capacity and/or processor capacity of the auxiliary device 206 is capable of presenting a high-data-rate stream, the auxiliary application portion 216 may feature high-quality animations and a visually dynamic user interface; but if the network capacity and/or processor capacity of the auxiliary device 206 are more limited the auxiliary application portion 216 may be rendered in a more static or conservative manner. As a third such example, the adaptation of the auxiliary computing environment 208 may integrate the resources of the auxiliary device 206 with those of the primary device 202 to present the application 212; e.g., a camera provided by the auxiliary device 206 may transmit captured video through the auxiliary computing environment 208 to the primary device, which may utilize the captured video with the application 212.

As a fourth example of a technical effect that may be achievable by the techniques presented herein, the distribution of the application 212 through partitioning 218 performed by the primary device 202 may be utilized with a wide variety of applications 212, including those that are not particularly configured to support such distribution and/or partitioning 218. For example, an application 212 that utilizes the user interface platform of the primary device 202 may be partitioned 218 and distributed over the primary device 202 and the auxiliary device 206 through reconfiguration of the user interface platform, without utilizing any such support from the application 212. Moreover, such distribution may not involve any deployment of the application to the auxiliary device 206; e.g., the application 212 does not have to be installed on the auxiliary device 206 in order to be deployed to it within the auxiliary computing environment 208 and presented by the auxiliary device 206.

Presenting the application 212 in accordance with the techniques presented herein may therefore reduce the amount of configuration and maintenance to be performed by the user 102 to achieve such partitioning. Additionally, the techniques presented herein may enable a centralized administration of the application 212. For example, the user 102 may variously partition the application 212 with a number of auxiliary devices 206, and a reconfiguration of the application 212 may not entail an interaction with a local application configuration on each such auxiliary device 206; rather, updating the configuration of the application 212 on the primary device 202 enables a presentation of the updated configuration of the application 212 on the auxiliary devices 206 without further administration of the application configuration.

As a fifth example of a technical effect that may be achievable by the techniques presented herein, the interaction of the primary application portion 214 and the auxiliary application portion 216 of the application 212 may be achieved easily, within the same process of the primary device 202 and/or through an interprocess communication or file sharing mechanism within the primary device 202, rather than utilizing device and/or network interconnectivity between the primary device 202 and the auxiliary device 206. For example, in the third example scenario 128 of FIG. 1, the interoperation 134 of the application server 130 and the application client 132 may be obstructed by networking issues, such as connectivity issues on one or both devices, network latency, firewalls, and privacy concerns; but the execution of the application 212 by the primary device 202 enables the primary application portion 214 and the auxiliary application portion 216 to communicate rapidly and efficiently within the primary device 202.

As a sixth example of a technical effect that may be achievable by the techniques presented herein, a high-quality computing experience may be presented on a comparatively low-powered auxiliary device 206. For example, by allocating the computational burdens of rendering the auxiliary computing environment 208 and executing the application 212 to the primary device 202, the techniques presented herein may enable the presentation of a high-quality auxiliary computing environment 208 on an auxiliary device 206 that may not even have enough computational resources to render such an auxiliary computing environment 208 in a local context at the same quality level. Outdated hardware may therefore be utilized to present the auxiliary application portion 216 of an application 212 executed by the primary device 202. That is, the auxiliary device 206 may not have suitable computational resources to execute a computationally intensive application 212, and the execution of the application 212 by the primary device 202 with distribution of the auxiliary application portion 216 to the auxiliary device 206 may enable the auxiliary device 206 to present the auxiliary application portion 216 that the auxiliary device 206 is not natively capable of generating. Additionally, the performance of the application 212 may be scaled up by scaling up the resources of the primary device 202, without having to scale up the auxiliary device 206 as well.

As an seventh example of a technical effect that may be achievable by the techniques presented herein, the use of the techniques presented herein may enable a user 102 to achieve a distribution of the application 212 to include an auxiliary device 206 that is not necessarily owned by the user 102 and/or regularly accessed by the primary device 202. For example, a publicly accessible computing workspace may comprise a collection of auxiliary devices 206 including displays, keyboards, speakers, and peripheral devices such as printers, which, upon interfacing with a primary device 202 of the user 102, enable the presentation of the auxiliary computing environment 2089 and the auxiliary application portion 216 of the application 212. These and other technical effects may be achievable through various implementations of the techniques presented herein.

D. Example Embodiments

Figure 3:
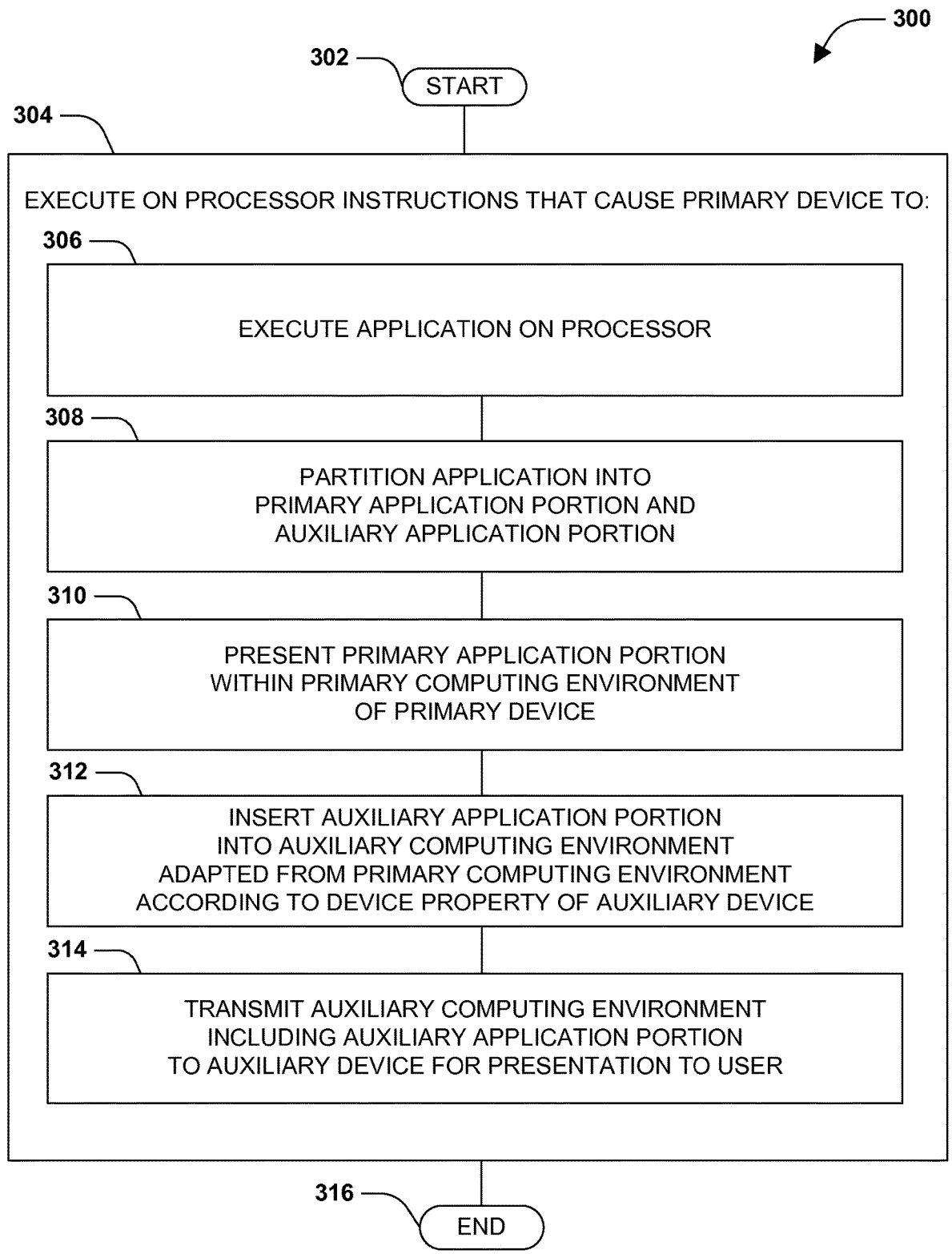
FIG. 3 is a flow diagram of an example method of presenting an application on a primary device and through an auxiliary device, in accordance with the techniques presented herein.

FIG. 3 presents a first example embodiment of the techniques presented herein, illustrated as an example method 300 of configuring a primary device 202 to present an application 212 with the assistance of an auxiliary device 206. The example method 300 may be implemented, e.g., as a set of instructions stored in a memory component of the primary device 202, such as a memory circuit, a platter of a hard disk drive, a solid-state storage device, or a magnetic or optical disc, and organized such that, when executed on a processor of the device, cause the device 104 to operate according to the techniques presented herein.

The example method 300 begins at 302 and involves executing 304 the instructions on a processor of the primary device 202. Specifically, executing 304 the instructions on the processor causes the primary device 202 to execute 306 the application 212 on a processor of the primary device 202. Executing the instructions also causes the primary device 202 to partition 308 the application 212 into a primary application portion 214 and an auxiliary application portion 216. Executing the instructions also causes the primary device 202 to present 310 the primary application portion 214 within a primary computing environment 204 of the primary device 202. Executing the instructions also causes the primary device 202 to insert 312 the auxiliary application portion 216 into an auxiliary computing environment 208 that is adapted from the primary computing environment 204 according to a device property 210 of the auxiliary device 206. Executing the instructions also causes the primary device 202 to transmit 314 the auxiliary computing environment 208, including the auxiliary application portion 216, to the auxiliary device 206 for presentation to the user 102. In this manner, the instructions enable toe primary device 202 to present the application 212 including the auxiliary device 206 in accordance with the techniques presented herein, and so ends at 316.

Figure 4:
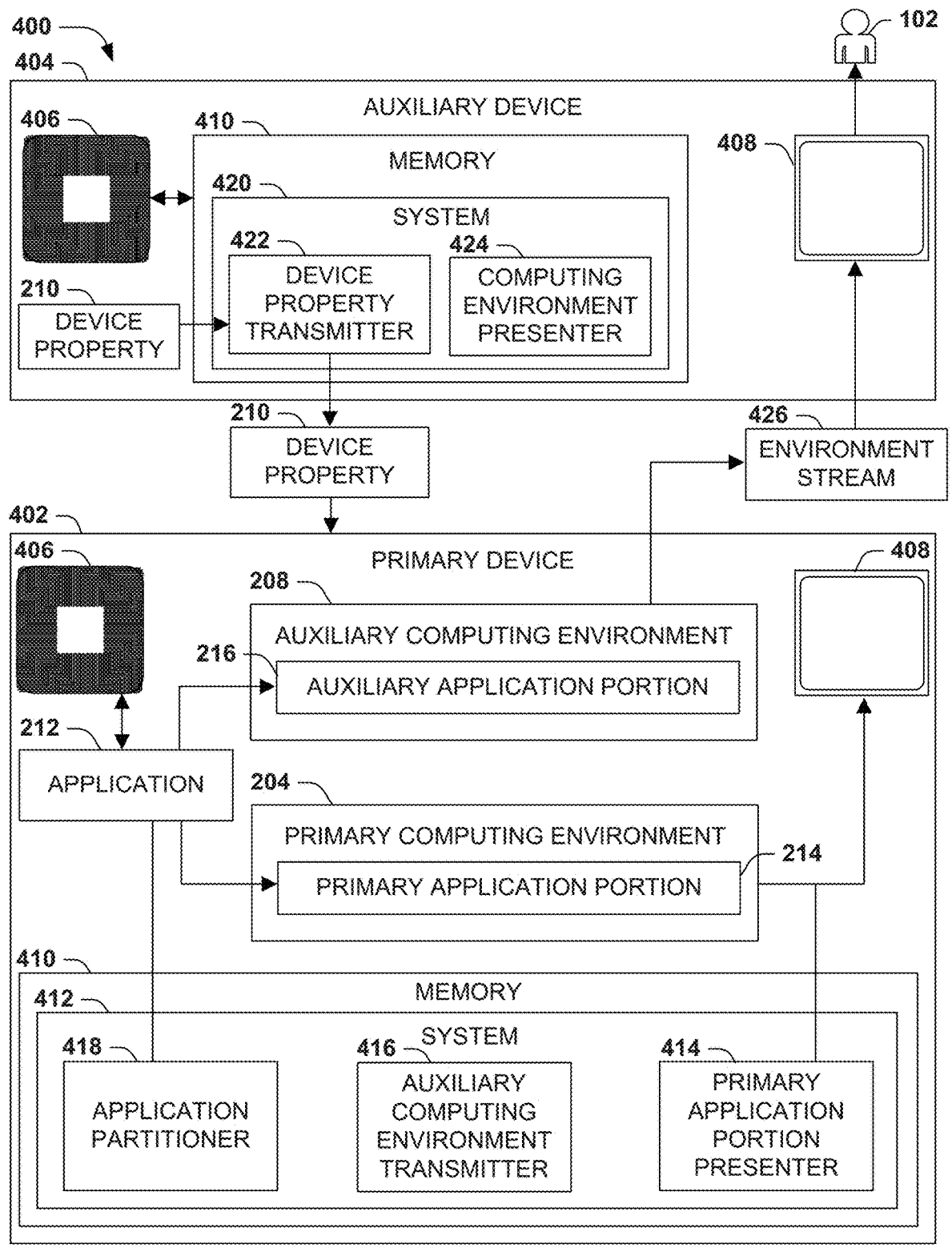
FIG. 4 is a component block diagram of example systems provided to enable a primary device and an auxiliary device to present an application partitioned therebetween, in accordance with the techniques presented herein.

FIG. 4 presents a second example embodiment of the techniques presented herein, illustrated as example systems that may be utilized by an example primary device 402 and an example auxiliary device 404 to achieve a partitioned presentation of an application 202. In this example scenario 400, each of the example primary device 402 and the example auxiliary device 404 features a processor 406, a display 408, and a memory 410 that includes instructions that, when executed on the processor 406 of the respective device, provide a system that utilizes at least a portion of the techniques presented herein.

While the example primary device 402 executes the application 212 on the processor 406, the example primary device 402 utilizes a first example system 412 to achieve a partitioning and distribution of the application 212 to include the auxiliary device 404. The first example system 412 comprises an application partitioner 418, which partitions the application 212 into a primary application portion 214 and an auxiliary application portion 216, and inserts the auxiliary application portion 216 into an auxiliary computing environment 208 that is adapted from the primary computing environment 204 according to a device property 210 of the auxiliary device 404. The first example system 412 also comprises an auxiliary computing environment transmitter 416, which transmits the auxiliary computing environment 208, including the auxiliary application portion 216, to the auxiliary device 404 (e.g., as an audio and/or video stream 426) for presentation to the user 102. The first example system 412 also comprises a primary application portion presenter 414, which presents the primary application portion 214 on the display 408 of the primary computing environment.

The example auxiliary device 404 features a second example system 420, comprising a device property transmitter 422, which transmits one or more device properties 210 of the example auxiliary device 404 to the example primary device 402. The second example system 420 further comprises a computing environment presenter 424, which receives, from the example primary device 402, the auxiliary computing environment 208 that has been adapted from the primary computing environment 204 according to the at least one device property 210 of the example auxiliary device 404, and where the auxiliary computing environment 208 includes the auxiliary application portion 216 of the application 212. The computing environment presenter 424 therefore presents the auxiliary computing environment 208 on the display 408 of the example auxiliary device 404. In this manner, the example primary device 402 and the example auxiliary device 404 interoperatively achieve the distributed presentation of the application 212 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
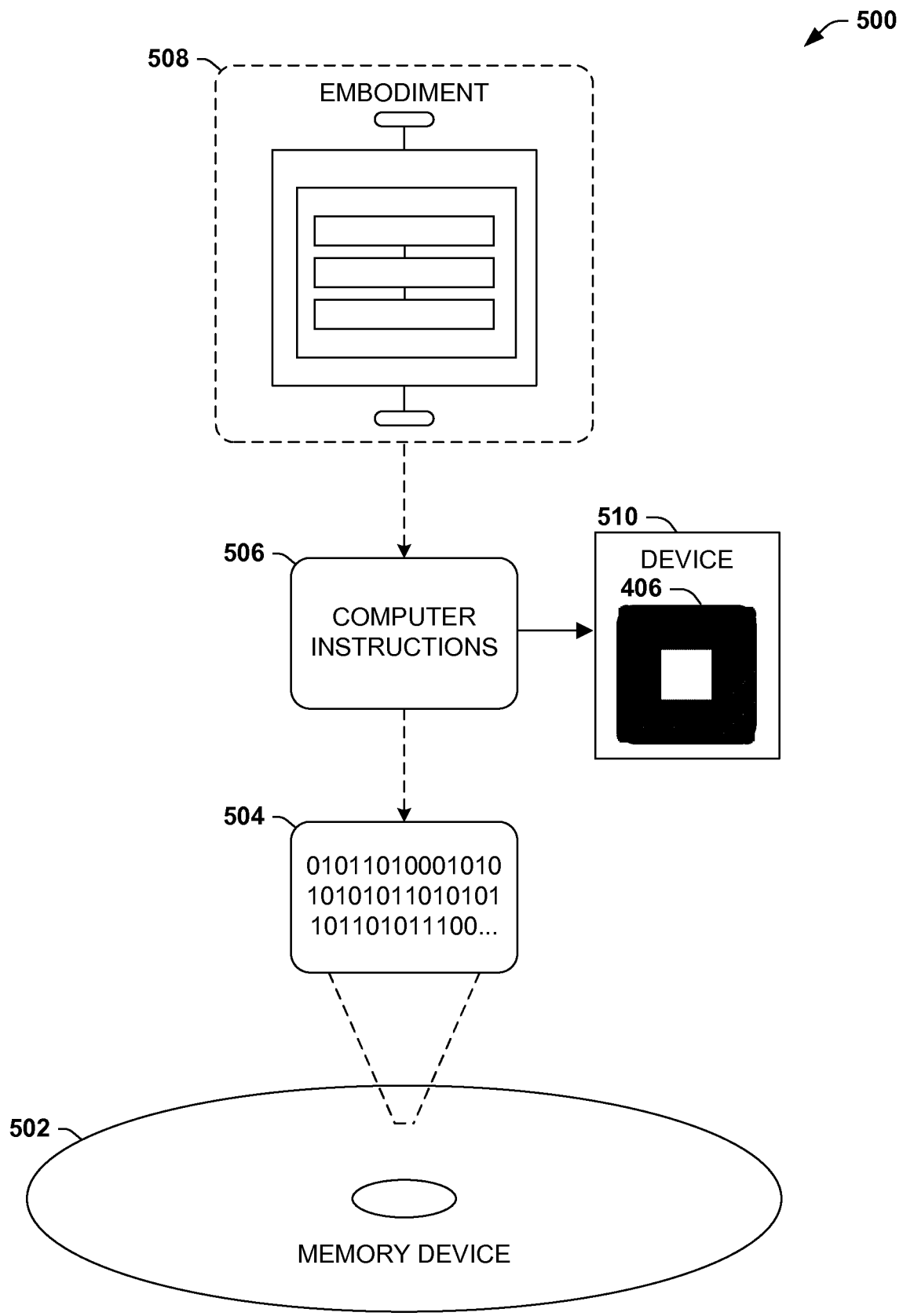
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-ft DVD-R, or a platter of a hard disk drive), on which is encoded computer-readable data 504. This computer-readable data 504 in turn comprises a set of computer instructions 506 that, when executed on a processor 406 of a device 510, cause the device 510 to operate according to the principles set forth herein. In a first such embodiment 508, the processor-executable instructions 506 may cause the device 510 to perform a method of enabling a primary device 202 to present an application 212 with an auxiliary device 206, such as the example method 300 of FIG. 3. In a second such embodiment, the processor-executable instructions 506 may cause the device 510 to provide a system for enabling a primary device 202 to present an application 212 with an auxiliary device 206, and/or a system for enabling an auxiliary device 206 to present an application 212 transmitted by a primary device 202, such as the example systems presented in the example scenario 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example systems of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, the techniques presented herein may be utilized with a variety of application 212 presented within the auxiliary computing environment 208 of the auxiliary device 206, such as office productivity applications; media presenting applications, such as audio and video players; communications applications, such as web browsers, email clients, chat clients, and voice over IP (VoIP) clients; navigation applications, such as geolocation, mapping, and routing applications; utilities, such as weather and news monitoring applications that present alerts to the user 102; and games. Moreover, the application 212 of the auxiliary computing environment 208 may involve a presentation of content through one or more presentation modalities, such as text, images, live and/or prerecorded video, sound effects, music, speech, tactile feedback, three-dimensional rendering, and interactive and/or non-interactive user interfaces, as well as various techniques for receiving user input from the user 102, such as text input, pointing input, tactile input, gestural input, verbal input, and gaze tracking input.

As a third variation of this first aspect, the techniques presented herein may be utilized with a variety of architectures. As a first such example, the primary device 202 and/or the auxiliary device 206 may utilize components that are directly and physically connected to each such device, such as wired displays, speakers, and headphones. As a second such example, the primary device 202 and/or the auxiliary device 206 may utilize one more components that are accessible via a wireless connection, such as a radiofrequency. As a third such example, the primary device 202 and/or the auxiliary device 206 may communicate over a personal-area, local-area, and/or wide-area network in order to interoperate according to the techniques presented herein. As a fourth such example, the primary device 202 and/or the auxiliary device 206 may utilize one or more components that are accessible through another device of a device collection, such as in a client/server or peer-to-peer architecture. Moreover, the primary device 202 and/or the auxiliary device 206 may be utilized by one user 102 or by a group of users 102, and/or may be controlled by at least one first user 102 on behalf of at least one second user 102. These and other scenarios may be suitable for the presentation of a computing environment through the interoperation of the primary device 202 and the auxiliary device 206 in accordance with the techniques presented herein.

E2. Generating and Transmitting Auxiliary Computing Environment

A second aspect that may vary among embodiments of the techniques presented herein relates to the manner in which the primary device 202 transmits the auxiliary computing environment 208 to the auxiliary device 206, and in which the auxiliary device 206 presents the auxiliary computing environment 208 to the user 102.

As a first variation of this second aspect, many types of device properties 210 of the auxiliary device 206 may be identified and used to generate and adapt the auxiliary computing environment 208 and/or the application 212 executed therein for the auxiliary device 206. As a first such example, the device properties 210 of the auxiliary device 206 may include the presence and functionality of various hardware components, such as the computational throughput, parallel processing support, and instruction set architectures of various processors and coprocessors; the capacity, speed, and volatility of memory and storage; the modality, sensitivity, and recognition capabilities of various input devices, such as keyboards, mice, touch-sensitive displays, microphones, and cameras; the, size, resolution, and responsiveness of various visual output devices; the volume and quality of various audio output devices; the throughput, latency, and buffer capacity of various communications devices; and the properties of various other peripheral devices, such as printers, scanners, and biometric sensors. As a second such example, the device properties 210 of the auxiliary device 206 may include computational capabilities that are partly or wholly achievable through software, such as encoding and/or decoding various forms of media; encrypting, compressing, decompressing, decrypting, and/or verifying various types of data; utilizing various instruction sets and virtual devices, such as through hardware and/or software emulation or the accessibility of various types of language parsing or translation resources; processing various types of graphics requests, such as three-dimensional graphics rendering; and applying various security measures, such as user authentication. As a third such example, the device properties 210 of the auxiliary device 206 may include the circumstances in which the auxiliary device 206 is used, such as the availability of power (e.g., the presence and operating status of a utility line, a battery, and an uninterruptible power supply (UPS)). As a fourth such example, the device properties 210 of the auxiliary device 206 may include interrelationships between the auxiliary device 206 and other devices, such as the accessibility of network-attached storage (NAS), and the role of the auxiliary device 206 in a network, such as its peer-to-peer, client/server, and/or superior-subordinate relationships with other devices. As a fifth such example, the device properties 210 of the auxiliary device 206 may include the context in which one or more users 102 interact with the auxiliary device 206, such as the public, private, and/or secured nature of the auxiliary device 206, and the tasks that a particular user 102 typically engages with the auxiliary device 206 to perform.

As a second variation of this second aspect, a primary device 202 may determine the device properties 210 of an auxiliary device 206 in a variety of ways. As a first such example, the auxiliary device 206 may detect various device properties of the auxiliary device 206, such as by querying and identifying each hardware component of the auxiliary device 206, and may transmit such information to the primary device 202. As a second such example, the auxiliary device 206 may comprise an auxiliary device identifier (e.g., a product number, model number, and/or serial number), and the primary device 202 and/or auxiliary device 206 may look up the device properties 210 of the auxiliary device 206 in a device catalog to identify the device properties 210 of such auxiliary device 206 associated with the auxiliary device identifier. As a third such example, the auxiliary device 206 and/or the primary device 202 may measure the operation of the auxiliary device 206 under particular operating conditions (e.g., evaluating the processing capacity and/or network capacity of the auxiliary device 206 under test conditions, or while in ordinary use). As a fourth such example, the auxiliary device 206 and/or the primary device 202 may predict and/or deduce the device properties 210 of the auxiliary device 206; e.g., the context in which a user 102 interacts with the auxiliary device 206 may be determined by deduction achieved by monitoring the tasks that are often performed with the auxiliary device 206. As a fifth such example, the auxiliary device 206 and/or the primary device 202 may receive information about the device properties 210 of the auxiliary device 206 from one or more users 102. As a sixth such example, the primary device 202 may poll the auxiliary device 206 for such information (e.g., upon receiving a request to instantiate an applications 212 for an auxiliary device 206), and/or the auxiliary device 206 may push the information to the primary device 202 (e.g., as part of a request to join a device collection of the user 102).

As a third variation of this second aspect, the primary device 402 may generate an auxiliary computing environment 208 adapted from the primary computing environment 204 in a number of ways. As a first such example, the primary device 202 may store the primary computing environment 204 as a template image, and may generate the auxiliary computing environment 208 as a clone of the primary computing environment 204 with adjustments applied in view of the device properties 210 of the auxiliary device 206. As a second such example, the primary device 202 may actively utilize the primary computing environment 204, and may generate, store, and apply a transform, such as a diff file, to generate the auxiliary computing environment 208 adapted for a particular auxiliary device 206. As a third such example, the primary computing environment 204 may comprise a superset of functionality available on all auxiliary devices 206 (e.g., a complete set of operating system and computing environment settings, application 212, application configurations, application states, and user accounts), and the primary device 202 may select a subset of the functionality of the primary computing environment 204 as the auxiliary computing environment 208 of a particular auxiliary device 206. For example, a particular application 212 may be stored within the primary computing environment 204 as a set of application variants that are respectively adapted for various types of auxiliary devices 206 (e.g., a workstation-form-factor user interface; a large-display user interface; and small-display user interfaces for various mobile devices), and the primary device 202 may select the application variant that is suitable for presentation within the auxiliary computing environment 208 of a particular auxiliary device 206. Such techniques may enable a re-use of the resources of the primary device 202 (e.g., storing and using a single copy of a particular application or application library on behalf of a large number of auxiliary devices 206).

As a fourth variation of this second aspect, the primary device 202 may render and/or transmit a stream 426 of the auxiliary computing environment 208 to an auxiliary device 206 in a number of ways. As a first such example, the primary device 202 may receive an input stream 426 from the auxiliary device 206, and/or may stream 426 video and/or audio output to the auxiliary device 206. As a second such example, the primary device 202 may transmit to the auxiliary device 206 a stream 426 of graphics primitive instructions, such as differential updates of a currently presented video frame to produce a next video frame in the stream 426. As a third such example, the primary device 202 may transmit a subordinate application to the auxiliary device 206 that may be executed thereupon to render part or all of the auxiliary computing environment 208 of the auxiliary device 206. As a fourth such example, the primary device 202 may multicast a stream 426 for a portion or an entirety of an auxiliary computing environment 208 to two or more auxiliary devices 206 for presentation thereupon. As a fifth such example, the primary device 202 may transmit a portion of the auxiliary computing environment 208 for a first auxiliary device 206 for retransmission to a second auxiliary device 206 that presents the auxiliary computing environment 208 to the user 102.

As a fifth variation of this second aspect, the primary device 202 may adapt the provision of the auxiliary computing environment 208 in order to provide an adequate user experience on the auxiliary device 206. For example, the primary device 202 may have adequate computational resources to provide a suitably responsive user experience for a particular auxiliary device 206, but if overloaded with too many applications 212, the primary device 202 may exhibit diminished and unsatisfactory performance, such as lag and/or interruptions in the transmission of the stream 426 of the auxiliary computing environment 208 to the auxiliary device 206. Various techniques may be utilized to mitigate diminished and unsatisfactory quality of service. As a first such example, the primary device 202 may estimate a maximum quality of the application 212 that the primary device 202 is capable of driving without compromising the quality of the presentation (e.g., a maximum visual quality and/or computational speed), and may constrain the application 212 to a resource limit that maintains the presentation quality of the application 212 on the primary device 202 and the auxiliary device 206. Such estimation may be informed, e.g., by measuring the achieved quality of the application 212 in various circumstances, and may adapt the execution of the application 212 to reflect changing circumstances (e.g., expanding the quality of the application 212 if more plentiful processing and/or network capacity is provided, and/or reducing the quality of the application 212 if the available processing and/or network capacity become constrained). Many such configurations in the generation, presentation, and transmission of the auxiliary computing environment 208 to the auxiliary devices 206 may be utilized in accordance with the techniques presented herein.

E2. Application Partitioning and Distribution

A third aspect that may vary among embodiments of the techniques presented herein involves the manner of partitioning the application 212 into the primary application portion 214 and the auxiliary application portion 216, and distributing the auxiliary application portion 216 to the auxiliary device 206.

As a first variation of this third aspect, responsive to detecting an availability of the auxiliary device 206, the primary device 202 may establish a connection with the auxiliary device 206, and detect the one or more device properties 210 of the auxiliary device 206. The primary device 202 may then generate the auxiliary computing environment 208 adapted from the primary computing environment 204 according to the device property 210 of the auxiliary device 206, and initiate the transmission of the auxiliary computing environment 208 to the auxiliary device 206. Alternatively, the primary device 202 may have already generated the auxiliary computing environment 208 (e.g., storing the auxiliary computing environment 208 generated during a prior interaction with the auxiliary device 206, and/or retrieving a prefabricated auxiliary computing environment 208 from a library of such environments for various types of auxiliary devices 206). As a further such variation, the primary device 202 may further comprise a proximity detector that detects a physical proximity of an auxiliary device 206 within a physical proximity threshold (e.g., a near-field communication (NFC) communication component), and the primary device 202 may detect the availability of the auxiliary device 206 as the physical proximity of the auxiliary device 206 within the physical proximity threshold. That is, the user 102 may establish a connection between the primary device 202 and the auxiliary device 206 simply by positioning the devices in close proximity.

Figure 6:
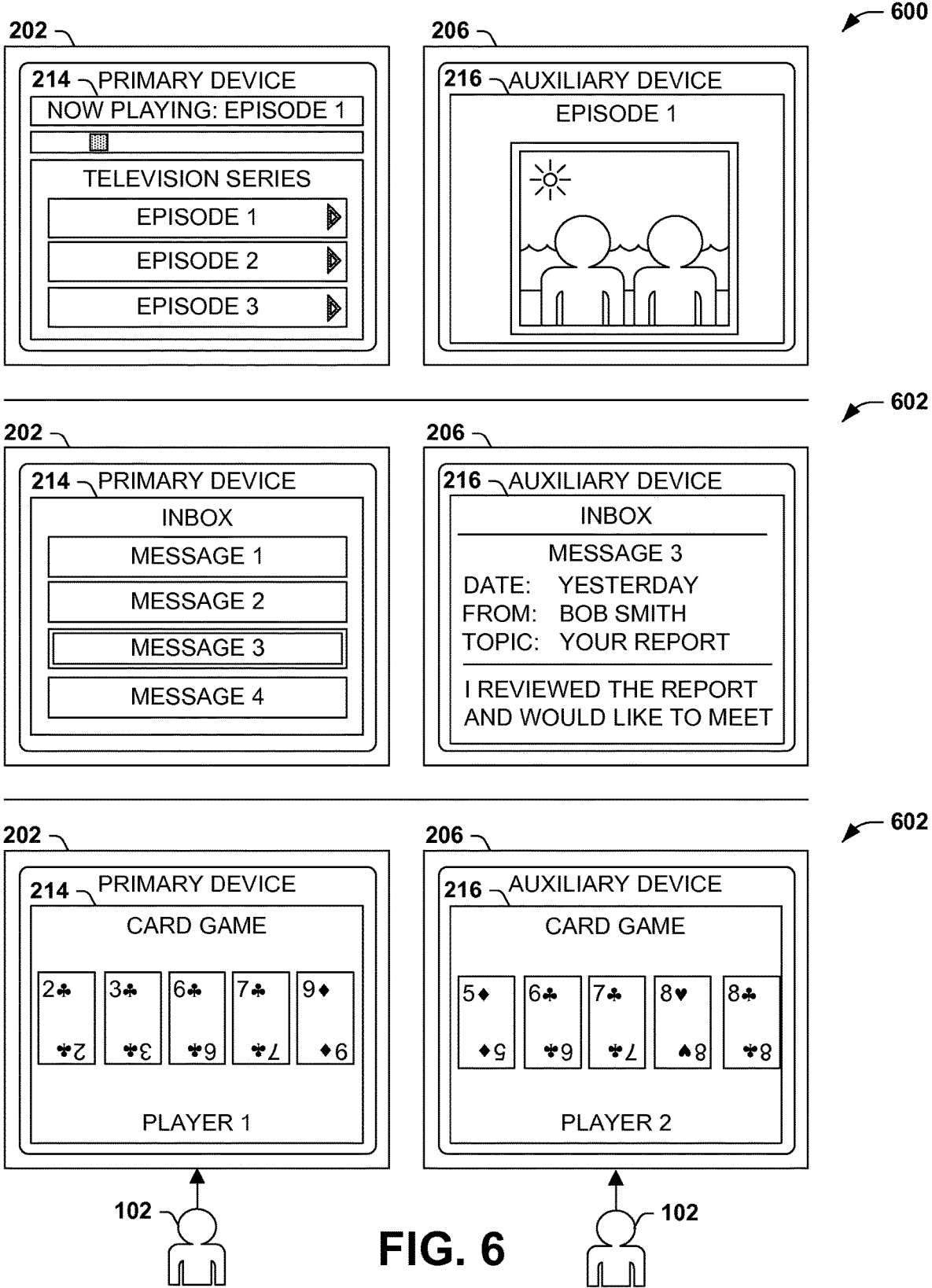
FIG. 6 is an illustration of an example scenario featuring various techniques for partitioning a user interface of an application across a primary device and a secondary device, in accordance with the techniques presented herein.

FIG. 6 presents an illustration of a set of example scenarios featuring a second variation of this third aspect, wherein the partitioning of the application 212 into a primary application portion 214 and an auxiliary application portion 216 may be achieved in various ways. In a first example scenario 600, the application 212 comprises a presentation of a content item, such as a video series, and the application 212 is partitioned into an auxiliary application portion 216 that provides a presentation of the content item within the auxiliary computing environment 208 of the auxiliary device 206, and a primary application portion 214 that provides a presentation controller within the primary computing environment 204 that controls the presentation of the content item. That is, the primary device 202 may be utilized as a controller of the media presentation on the auxiliary device 206, or vice versa.

In a second example scenario 602, the elements of a user interface that are presented together when presented on one device may be distributed over the primary application portion 214 presented on the primary device 202 and the auxiliary application portion 216 presented on the auxiliary device 206. For example, the user interface elements may be rearranged into a first user interface element collection presented on the primary device 202, and a second user interface element collection presented on the auxiliary device 206, and the respective user interface elements may be resized to match the size, resolution, and other device properties 210 of each device. As one such example, user interface elements presented on a device with a touch-sensitive display may present a touch-oriented appearance and behavior, while user interface elements presented on a device with a non-touch-sensitive display may exhibit a pointer-oriented appearance and behavior. Alternatively, the user 102 may be able to use touch input on the primary device 202 to utilize user interface elements of the auxiliary device 206; e.g., a pointer that is controlled with the user's finger on the touch-sensitive display of the primary device 202 may be moved to the auxiliary computing environment 208 of the auxiliary device 206, and so the visual elements presented on the auxiliary device 206 may exhibit touch-compatible behavior, even though the auxiliary device 206 does not have touch capability.

In a third example scenario 604, an application 212 may be partitioned into a primary application portion 214 to be presented to the user 102 viewing the application 212 through the primary device 202 within the primary computing environment 208, and an auxiliary application portion 208 to be presented to a second user viewing the application 212 through the auxiliary device 206. For example, a game application may present some secret information to the first user 102, such as the first user's hand in a card game, and may transmit to the auxiliary device 206 an auxiliary application portion 216 that presents some secret information to the second user 102, such as the second user's hand in the card game.

As a second variation of this third aspect, the primary device 202 may further integrate various resources of the auxiliary device 206 with the primary computing environment 204 and/or the application 212. For example, the primary device 202 may further comprise a first input component, and the auxiliary device 206 may further comprise a second input component. Responsive to receiving first user input from the first input component, the primary device 202 may apply the first user input to the application 212; and responsive to receiving, from the auxiliary device 206, second user input provided through a second input component of the auxiliary device 206, the primary device 202 may also apply the second user input to the application 212.

As a third variation of this third aspect, in addition to presenting the primary application portion 214 of the application 212, the primary device 202 may provide other functionality while transmitting the auxiliary computing environment 208 including the auxiliary application portion 216 to the auxiliary device 206. For example, responsive to receiving a request to present a second application 212 within the primary computing environment 204, the primary device 202 may present the second application 212 within the primary computing environment 204 alongside and/or instead of the primary application portion 214 of the application 212. During such presentation, the auxiliary device 206 may continue presenting only the auxiliary application portion 216, or the partitioning of the application 212 may be reversed, e.g., by consolidate the primary application portion 214 into the auxiliary application portion 216 presented within the auxiliary computing environment 208 of the auxiliary device 206.

Figure 7:
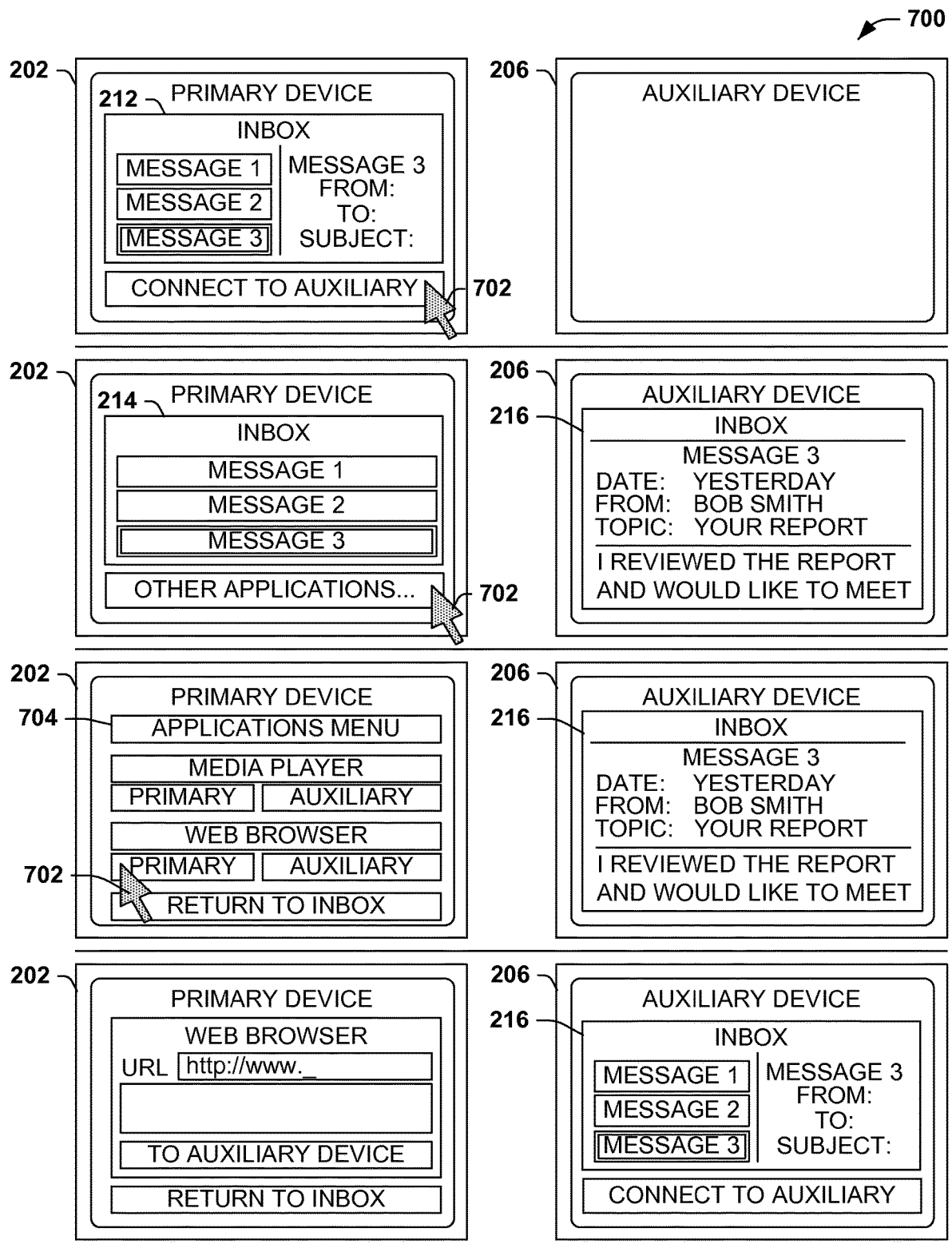
FIG. 7 is an illustration of an example scenario featuring a control of an auxiliary device by a primary device, in accordance with the techniques presented herein.

FIG. 7 presents an illustration of an example scenario 700 featuring a sequence of interactions of a user 102 with a primary device 202 to partition and distribute an application 212 (such as a media player) between the primary device 202 and an auxiliary device 206. In this example scenario, the application 212 is initially presented only on the primary device 202, and the detection of an availability of an auxiliary device 206 for distributing the application 212 may be detected and presented to the user as an option. User input 702 comprising a selection of the option may lead to a connection between the primary device 202 and the auxiliary device 206, and a partitioning of the application 212 into a primary application portion 214 presented on the primary device 202, and an auxiliary application portion 216 that is transmitted to and presented by the auxiliary device 206. The primary device 202 may also present an option to execute other applications 212 on the primary device 202, and further user input 702 comprising a selection of the option may cause the primary device 202 to present a menu 704 featuring the available applications 212, including options for presenting the respective applications on the primary device 202, the auxiliary device 206, and/or distributed across both devices. User input 702 comprising a selection of a second application 212 (such as a web browser) may cause the primary device 202 to present only the second application 212 on the primary device 202. At this time, the auxiliary device 206 may continue presenting only the auxiliary application portion 216, or, as illustrated in FIG. 7, may present a consolidated application 212 that includes the primary application portion 214. When the user 102 exits the second application, the primary device 202 may return to displaying the primary application portion 214 of the first application 212, and a consolidation of the application 212 on the auxiliary device 206 may be reversed.

As a fifth variation of this third aspect, the termination of the application partitioning may be achieved responsive to a user request from the user 102. As another example, responsive to detecting a disconnection of the auxiliary device 206 from the primary device 202, the primary device 202 may consolidate the auxiliary application portion 216 of the application 212 into the primary computing environment 214 for presentation of the entire application 212 on the primary device 202, or may identify a second auxiliary device 206 to which the auxiliary application portion 216 may be relocated. As yet another example, wherein the auxiliary application portion 216 further comprises a presentation of a content item, the primary device 202 may terminate the transmission of the auxiliary computing environment 208 to the auxiliary device 206 responsive to detecting a completion of the presentation of the content item (e.g., reaching the end of an audio or video sequence presented on the auxiliary device 206). Many such variations may be utilized in the partitioning and distribution of the application 212 between the primary device 202 and the auxiliary device 206 in accordance with the techniques presented herein.

E4. User Input Gestures

A fourth aspect that may vary among embodiments of the techniques presented herein involves a set of user interface gestures that may be performed by the user 102 to control the application 212 partitioned and distributed across the primary device 202 and the auxiliary device 206. Such gestures are discussed with reference to FIGS. 8-9, which provide visual examples of such gestures performed on a device to interact with the application 212. Some such gestures may be performed with a pointing device (e.g., a mouse, touchpad, or trackball), with a touch-sensitive display (e.g., using a finger or stylus), or as a non-contact gesture that does not contact an input device (e.g., a manual or eye movement gesture detected by a camera). Additionally, although such examples are described as a gesture performed on the primary device 202 that produces an effect on the auxiliary device 206, such gestures may, in some circumstances, alternatively be performed on the auxiliary device 206 to produce an effect on the primary device 202.

Figure 8:
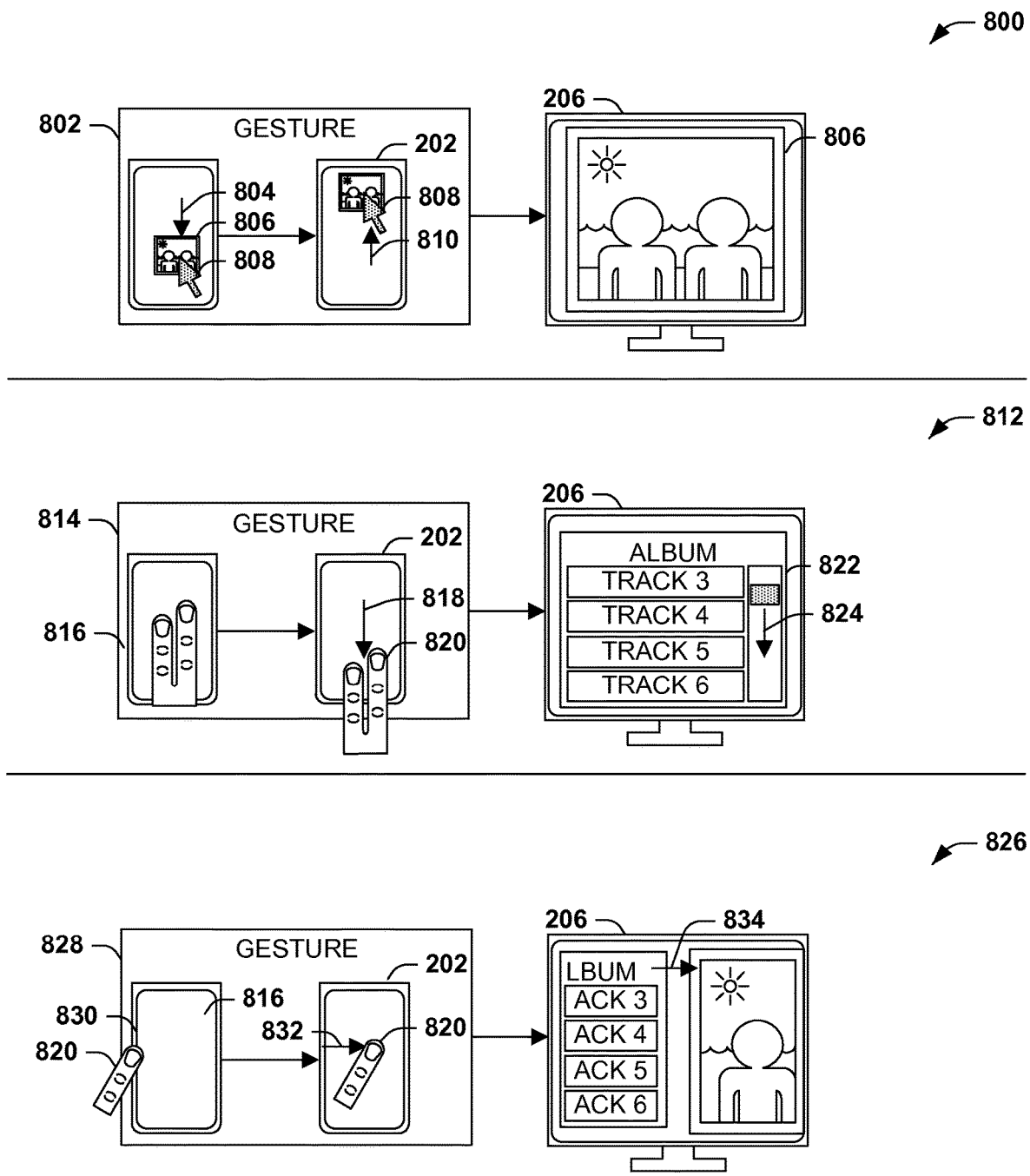
FIG. 8 is an illustration of an example scenario featuring a first set of example gestures that may performed on a primary device to enable control of an auxiliary device, in accordance with the techniques presented herein.

As a first variation of this fourth aspect, FIG. 8 presents an illustration of a first example scenario 800 of gesture detection by a primary device 202 further comprising a display presenting a pointer 808 and a content item 806. The primary device 202 may detect a "pull and flick" pointer gesture 802, comprising a pull motion 804 of the content item 806 away from an edge of the display, and a flick motion 810 toward the edge of the display. The primary device 202 may interpret this gesture as a request to present the content item 806 on the auxiliary device 206, and may therefore insert a presentation of the content item 806 into the auxiliary computing environment 208 for presentation by the auxiliary device 206. As a further variation, the primary device 202 may identify a selected edge of the display as physically or logically aligned toward the auxiliary device 206, such that a flick motion 810 performed toward the selected edge of the display causes a presentation of the content item 806 on the auxiliary device 206, and a flick motion 810 performed toward any other edge of the display does not.

As a second variation of this fourth aspect, FIG. 8 presents an illustration of a second example scenario 812 illustrating a second gesture, involving a primary device 202 further comprising a touch-sensitive input device 816, such as a touchpad. The primary device 202 may detect a two-finger drag gesture 814 that is associated with a scrollable element 822 of the auxiliary computing environment of the auxiliary device 206; e.g., the user 102 may touch two fingers 820 to a display of the primary device 202, and perform a drag motion 818 in a particular direction on the display. The primary device 202 may cause a scrolling 824 of the scrollable element 822 in response to the two-finger drag gesture 814 (e.g., scrolling 824 the scrollable element 822 upward if the two-finger drag gesture 814 is performed in an upward direction, and scrolling 824 the scrollable element 822 downward if the two-finger drag gesture is performed in a downward direction, or vice versa). As a further variation, the rate of scrolling 824 may be proportional to the rate of the drag motion 818 on the touch-sensitive device 816.

As a third variation of this fourth aspect, FIG. 8 presents an illustration of a third example scenario 826 illustrating a third gesture, wherein the primary device 202 detects that the user 102 of a touch-sensitive input device 816 has performed an edge swipe gesture 828 in an inward direction 832 from an edge 830 of the touch-sensitive input device 202 (e.g., a swipe from a bezel edge of a display or touchpad toward the center). The primary device 202 may interpret this edge swipe gesture 828 as a request to transition the auxiliary computing environment 208 from presenting a current application to presenting a previously presented application, and may therefore initiate a transition 834 with the auxiliary computing environment 208 from the current application to a different application.

Figure 9:
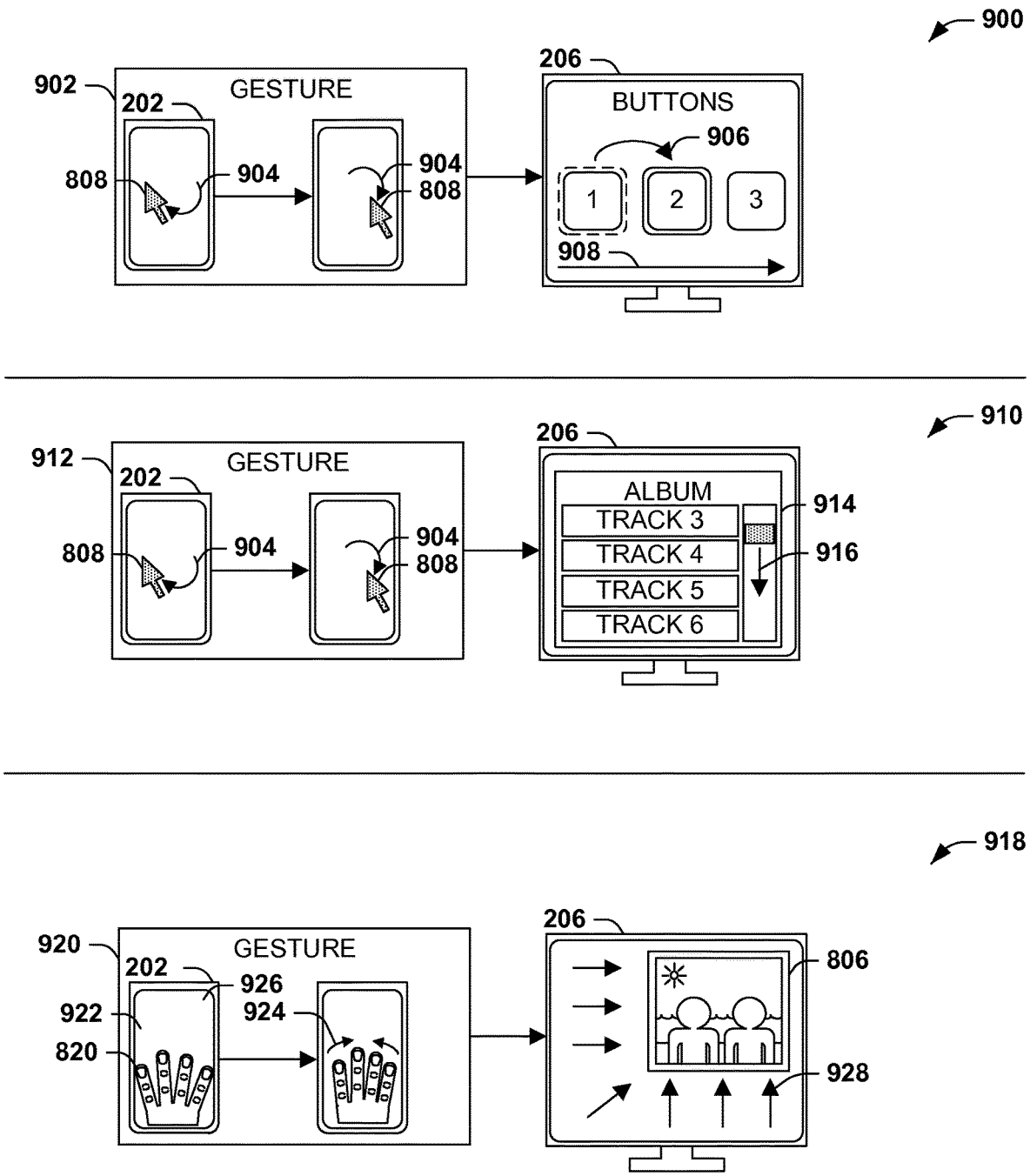
FIG. 9 is an illustration of an example scenario featuring a second set of example gestures that may performed on a primary device to enable control of an auxiliary device, in accordance with the techniques presented herein.

As a fourth variation of this fourth aspect, FIG. 9 presents an illustration of a fourth example scenario 900 illustrating a fourth gesture, wherein the primary device 202 detects that the user 102 of a pointer 808 performs a circular pointer gesture 902 involving moving the pointer 808 in a circular motion 904, while the auxiliary device 206 presents a sequence 908 of user interface elements, such as a row of buttons, where a selected user interface element is the current focus of user input. The primary device 202 may interpret this circular pointer gesture 902 as a request to transition a selected user interface element in the sequence 908 from a first user interface element to an adjacent user element in the sequence 908, and may implement the transition 906 by selecting the adjacent user element as the active user element on the auxiliary device 206.

As a fifth variation of this fourth aspect, FIG. 9 presents an illustration of a fifth example scenario 910 illustrating a fifth gesture, wherein the primary device 202 detects that the user 102 performs a circular pointer gesture 912 involving moving the pointer 808 in a circular motion 904 while the auxiliary device 206 is presenting a scrollable user interface element 914. The primary device 202 may interpret the circular pointer gesture 912 as a request to scroll the scrollable user interface element 914, and may therefore initiate a scrolling 916 of the scrollable user interface element 914.

As a sixth variation of this fourth aspect, FIG. 9 presents an illustration of a sixth example scenario 918 illustrating a sixth gesture, wherein the primary device 202 detects that the user 102 has performed a pinch gesture 920 using at least three fingers 820 (e.g., touching 926 at least three fingers 820 to the surface of the touch-sensitive display in an open configuration 922, and contracting 924 the fingers 820 into a closed configuration), while the auxiliary device 206 is currently presenting a content item 806 in a full-display mode. The primary device 202 may interpret the pinch gesture 920 as a request to transition the presentation of the content item 806 from the full-display mode to a partial-display mode, and may resize 928 the presentation of the content item 806 on the auxiliary device 206 to a smaller display size.

Many further variations in the detection and presentation of such gesture-based control may be included in such variations. As a seventh variation of this fourth aspect, upon detecting an initiation of a gesture that is associated with the auxiliary computing environment 208, the primary device 202 may present a pointer gesture user interface on the display instead of the primary computing environment 204; e.g., while the user 102 is performing a "scroll" gesture, the primary device 202 may present a full-screen scrollbar to assist the user's performance of the gesture, rather than the primary computing environment 204. Responsive to detecting a completion of the gesture, the primary device 202 may restore the primary computing environment 204 presented on the display instead of the pointer gesture user interface. In a further such variation, where the gesture is associated with a user interface element presenting user interface content within the auxiliary computing environment 208, the primary device 202 may present the pointer gesture user interface that reflects the user interface content of the user interface element. For example, while the user 102 performs a gesture on the primary device 202 that causes a scrolling of a list presented on the auxiliary device 206, the primary device 202 may display the contents of the list (e.g., in a magnified view) rather than the primary computing environment 204 until the user 102 has completed the scrolling, and may then resume the presentation of the primary computing environment 204 on the primary device 202. Many such variations may be included to enable gestures performed on the primary device 202 to affect the presentation of the auxiliary computing environment 208 on the auxiliary device 206 (or vice versa) in various embodiments of the techniques presented herein.

F. Computing Environment

Figure 10:
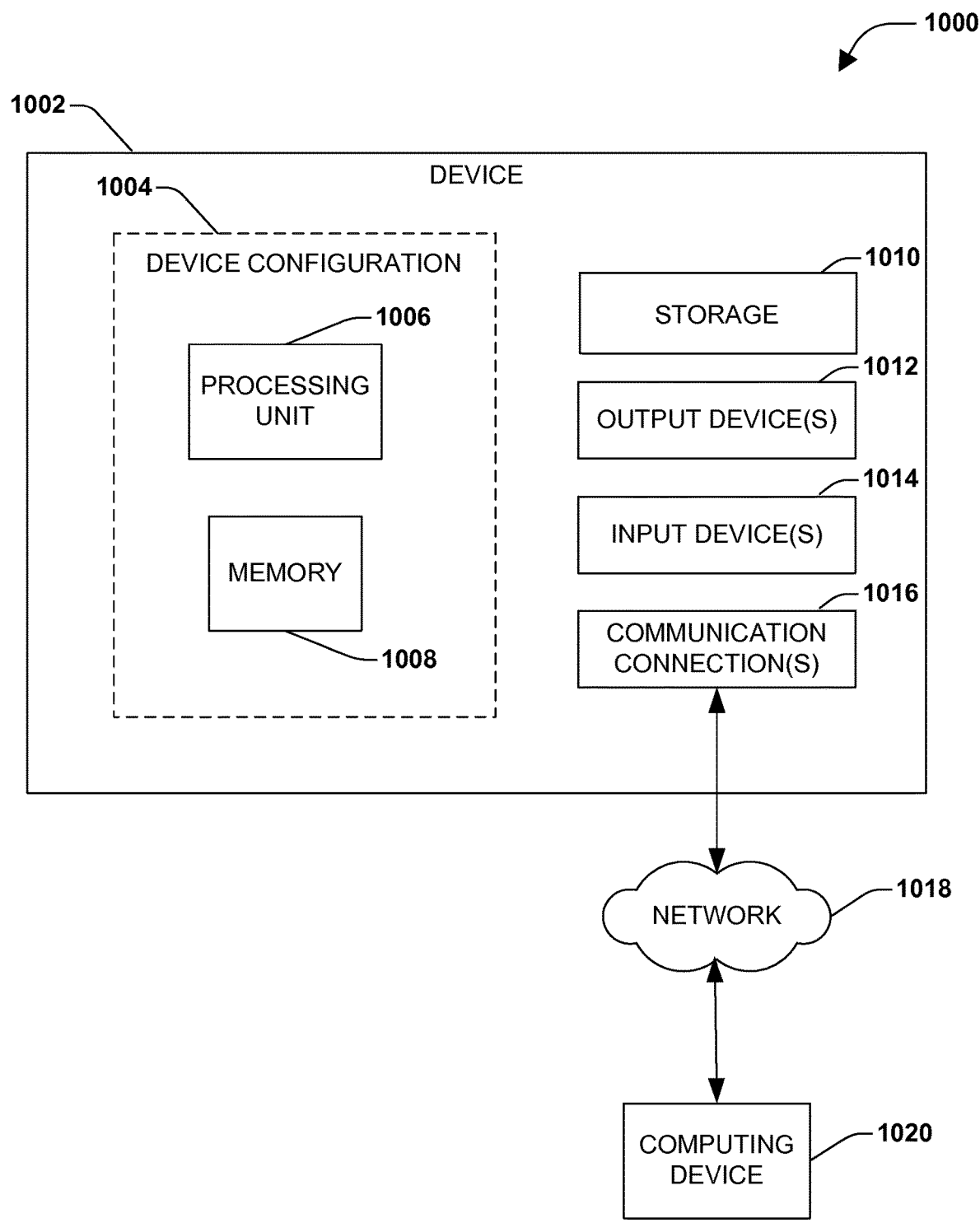
FIG. 10 is an illustration of an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 920 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting an application on both an auxiliary device and a primary device, the method comprising:
   presenting the application as a set of user interface elements on the primary device in a pointer-sensitive display that presents an application space comprising a primary application portion; and
   responsive to a request to partition the application between the primary device and the auxiliary device:
      expanding the application space to add, to the primary application portion an auxiliary application portion;
      for a user interface element of the application choosing the auxiliary device to display the user interface element, and selecting a location and a presentation of the user interface element within the auxiliary application portion; and
      for the primary device, rearranging the primary application portion of the primary device according to the presentation of the user interface element on the auxiliary device to create a first configuration of the primary application portion; and
   responsive to the pointer-sensitive display detecting a pointer gesture that modifies content displayed on the auxiliary application portion, implementing a second configuration of the primary application portion, the second configuration based on the pointer gesture; and
   responsive to the pointer-sensitive display detecting a completion of the pointer gesture, restoring the pointer-sensitive display to the first configuration of the primary application portion.

2. The method of claim 1, further comprising:
   establishing a connection with the auxiliary device;
   detecting a device property of the auxiliary device;
   generating the auxiliary application portion adapted from the primary application portion according to the device property of the auxiliary device; and
   transmitting the auxiliary application portion to the auxiliary device.

3. The method of claim 1, further comprising:
   detecting availability of the auxiliary device by a proximity detector of the primary device, wherein detecting the availability of the auxiliary device comprises detecting physical proximity of the auxiliary device within a physical proximity threshold of the primary device.

4. The method of claim 1, wherein:
   the application comprises a presentation of a content item;
   the auxiliary application portion presents the content item within the auxiliary device; and
   the primary application portion provides a presentation controller that controls presentation of the content item.

5. The method of claim 1, wherein:
   the primary device further comprises a first input component; and
   the method further comprises:
      responsive to receiving a first command from the first input component, apply the first command to the application; and
      responsive to receiving, from the auxiliary device, a second command from a second input component of the auxiliary device, apply the second command to the application.

6. The method of claim 1, further comprising responsive to receiving a request to present a second application within the primary device, present the second application within the auxiliary device instead of the primary device.

7. The method of claim 6, further comprising, while presenting the second application instead of the primary application portion on the primary device, consolidate the primary application portion into the auxiliary application portion presented within the auxiliary device.

8. The method of claim 1, wherein the auxiliary device does not have touch capability.

9. A primary device that presents an application together with an auxiliary device, the primary device comprising:
   a processor; and
   a memory storing instructions that, when executed on the processor, provide:
   an application partitioner that:
      initially presents the application as a set of user interface elements on the primary device in a pointer-sensitive display that presents an application space comprising a primary application portion; and
      responsive to a request to partition the application between the primary device and the auxiliary device:
         expands the application space to add, to the primary application portion, an auxiliary application portion;
         for a user interface element of the application choose the auxiliary device to display the user interface element, and select a location and presentation of the user interface element within the auxiliary application portion; and
         for the primary device, rearranges the primary application portion of the primary device based on a display size or resolution of the primary device and according to the presentation of the user interface element on the auxiliary device to create a first configuration of the primary application portion;
      and
   a computing environment presenter that:
      responsive to the pointer-sensitive display detecting a pointer gesture that modifies content displayed on the auxiliary application portion, implements a second configuration of the primary application portion, the second configuration based on the pointer gesture; and
      responsive to the pointer-sensitive display detecting a completion of the pointer gesture, restore the pointer-sensitive display to the first configuration of the primary application portion.

10. The primary device of claim 9, further comprising an auxiliary computing environment transmitter that transmits an auxiliary computing environment including the auxiliary application portion to the auxiliary device for display on the auxiliary device, wherein:
   the auxiliary application portion further comprises a presentation of a content item; and
   the auxiliary computing environment transmitter, responsive to detecting a completion of the presentation of the content item, terminates transmission of the auxiliary computing environment to the auxiliary device.

11. The primary device of claim 9, wherein the application partitioner, responsive to detecting a disconnection of the auxiliary device from the primary device, consolidates the auxiliary application portion of the application into the primary application portion.

12. The primary device of claim 9, wherein the primary device comprises a mobile phone with a touch-sensitive display.

13. A memory storage device storing instructions that, when executed on a processor of a primary device, cause the primary device to:
present an application as a set of user interface elements on the primary device in a pointer-sensitive display that presents an application space comprising a primary application portion;
responsive to a request to partition the application between the primary device and an auxiliary device:
expand the application space to add, to the primary application portion, an auxiliary application portion;
for a user interface element of the application, choose the auxiliary device to display the user interface element with additional content as compared to the user interface element displayed on the primary device, and select a location and a presentation of the user interface element within the auxiliary application portion; and
for the primary device, rearrange the primary application portion of the primary device according to the presentation of the user interface element on the auxiliary device to create a first configuration of the primary application portion;
responsive to the pointer-sensitive display detecting a pointer gesture that modifies content displayed on the auxiliary application portion, implement a second configuration of the primary application portion, the second configuration based on the pointer gesture; and
responsive to the pointer-sensitive display detecting a completion of the pointer gesture, restore the pointer-sensitive display to the first configuration of the primary application portion.

14. The memory storage device of claim 13, wherein:
the pointer-sensitive display presents a pointer and a content item; and
executing the instructions on the processor further causes the primary device to, responsive to detecting a pointer gesture comprising:
a pull motion of the content item away from an edge of the display, and
a flick motion toward the edge of the display,
insert the content item into the auxiliary application portion for presentation by the auxiliary device.

15. The memory storage device of claim 13, wherein executing the instructions further causes the primary device to, responsive to the pointer-sensitive display detecting a two-finger drag gesture associated with a scrollable element of the auxiliary application portion, apply a scroll operation to the scrollable element of the auxiliary application portion.

16. The memory device of claim 13, wherein: the primary device further comprises a pointer sensitive input device; and executing the instructions further causes the primary device to, responsive to the pointer sensitive input device detecting a circular pointer gesture associated with a scrollable element of the auxiliary application portion, apply a scroll operation to the scrollable element of the auxiliary application portion.

17. The memory storage device of claim 13, wherein:
executing the instructions further causes the primary device to, responsive to detecting a circular pointer gesture on the pointer-sensitive display while a sequence of at least two user interface elements is presented in the auxiliary application portion, transition one user interface element in the sequence from a first user interface element to an adjacent user element in the sequence.

18. The memory storage device of claim 13, wherein executing the instructions further causes the primary device to, responsive to the pointer-sensitive display detecting an edge swipe gesture in an inward direction from an edge of the pointer-sensitive display, transition the auxiliary application portion from presenting a current application to presenting a previously presented application.

19. The memory device of claim 13, wherein: the pointer-sensitive display comprises a touch sensitive input device; and executing the instructions further causes the primary device to, responsive to the touch-sensitive input device detecting a pinch gesture performed by at least three fingers while the auxiliary application portion presents a full-display view of the application, reduce the full-display view of the application to a partial-display view within the auxiliary application portion.

20. The memory storage device of claim 13, wherein the auxiliary device does not have touch capability.

* * * * *